United States Patent
Rashidinejad et al.

(10) Patent No.: US 12,081,271 B2
(45) Date of Patent: Sep. 3, 2024

(54) DIGITAL TONE-BASED APPARATUS AND METHOD FOR MEASURING THE FREQUENCY RESPONSE OF COHERENT OPTICAL TRANSMITTERS

(71) Applicant: Infinera Corporation, San Jose, CA (US)

(72) Inventors: Amir Rashidinejad, Ottawa (CA); Wenbo Gao, Allentown, PA (US)

(73) Assignee: Infinera Corporation, San Jose, CA (US)

( * ) Notice: Subject to any disclaimer, the term of this patent is extended or adjusted under 35 U.S.C. 154(b) by 0 days.

(21) Appl. No.: 18/091,870

(22) Filed: Dec. 30, 2022

(65) Prior Publication Data

US 2023/0146826 A1 May 11, 2023

Related U.S. Application Data

(62) Division of application No. 17/375,575, filed on Jul. 14, 2021.

(60) Provisional application No. 63/051,815, filed on Jul. 14, 2020.

(51) Int. Cl.
*H04B 10/548* (2013.01)
*H04B 10/50* (2013.01)
*H04B 10/58* (2013.01)

(52) U.S. Cl.
CPC ......... *H04B 10/548* (2013.01); *H04B 10/503* (2013.01); *H04B 10/58* (2013.01)

(58) Field of Classification Search
CPC .... H04B 10/548; H04B 10/503; H04B 10/58; H04B 2210/075; H04B 10/5057

USPC .......................................................... 398/187
See application file for complete search history.

(56) References Cited

U.S. PATENT DOCUMENTS

| | | | |
|---|---|---|---|
| 7,076,164 B2 * | 7/2006 | Carrick | H04B 10/07955 398/31 |
| 9,124,368 B2 * | 9/2015 | Urban | H04J 14/0298 |
| 9,485,019 B1 * | 11/2016 | Kim | H04J 14/02 |
| 9,712,249 B2 * | 7/2017 | Kim | H04B 10/0775 |
| 10,014,975 B2 * | 7/2018 | Krause | H04J 14/0298 |
| 2005/0012976 A1 * | 1/2005 | Harel | G02F 1/0123 359/239 |
| 2007/0263667 A1 * | 11/2007 | Dubuc | H04L 5/0048 370/500 |
| 2008/0145063 A1 * | 6/2008 | Li | H04B 10/40 398/140 |

(Continued)

FOREIGN PATENT DOCUMENTS

CN 107810611 A * 3/2018 ............... G02F 1/21

OTHER PUBLICATIONS

Shingo Uehara, "Calibration of optical modulator frequency response with application to signal level control", Applied Optics vol. 17, No. 1 Jan. 1, 1978 (Year: 1978).*

*Primary Examiner* — Abbas H Alagheband
(74) *Attorney, Agent, or Firm* — David L. Soltz

(57) ABSTRACT

An optical network component, system, and method are herein described. The system and method include introducing an amplitude modulated (AM) tone and data to an optical modulator generating a modulated optical signal, measuring an amplitude response of the AM tone within the modulated optical signal, calculating a frequency response based on the amplitude response, and calibrating the optical modulator with the frequency response.

8 Claims, 24 Drawing Sheets

(56) References Cited

U.S. PATENT DOCUMENTS

| | | | |
|---|---|---|---|
| 2009/0232518 A1* | 9/2009 | Caton | H04B 10/5051 |
| | | | 398/193 |
| 2011/0176815 A1* | 7/2011 | Frankel | H04B 10/548 |
| | | | 398/208 |
| 2016/0282699 A1* | 9/2016 | Gottwald | H04B 10/50577 |
| 2016/0323039 A1* | 11/2016 | Sun | H04J 14/026 |
| 2017/0005747 A1* | 1/2017 | Kim | H04B 10/07955 |
| 2017/0026132 A1* | 1/2017 | Wang | H04B 10/0795 |
| 2017/0317792 A1* | 11/2017 | Barich | H04L 1/244 |
| 2018/0145761 A1* | 5/2018 | Zhuge | H04B 10/077 |
| 2018/0173077 A1* | 6/2018 | Schmogrow | G02F 1/2255 |
| 2019/0386750 A1* | 12/2019 | Wang | H04B 10/532 |
| 2021/0119850 A1* | 4/2021 | Ng | H04B 10/50575 |

* cited by examiner

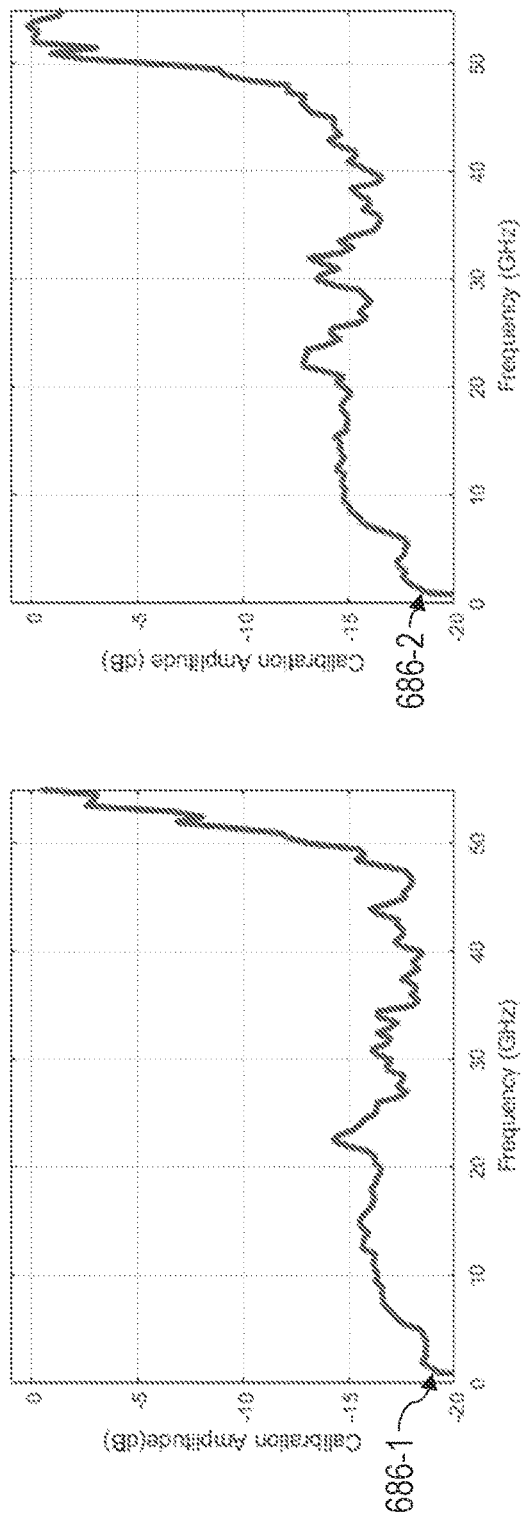
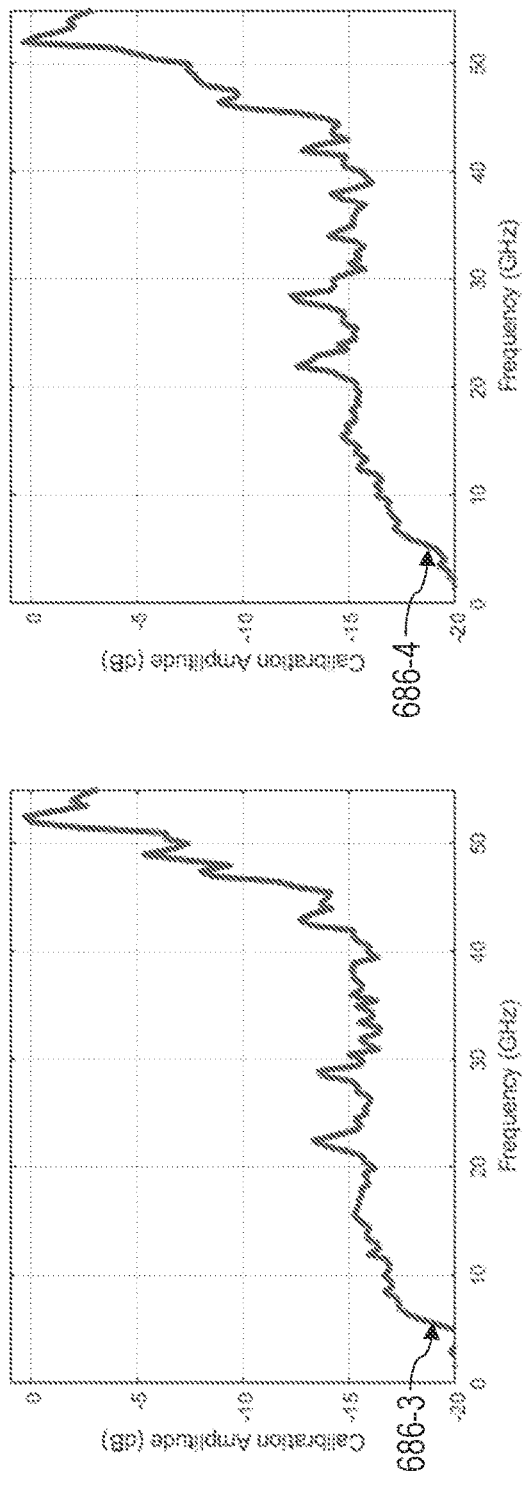
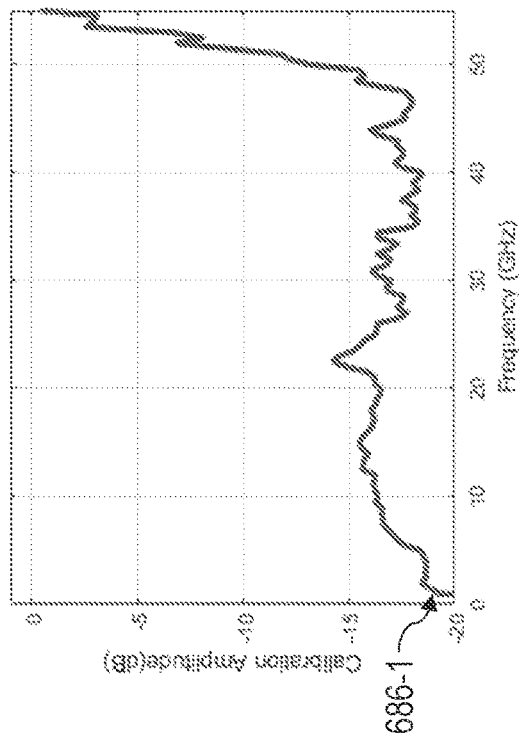
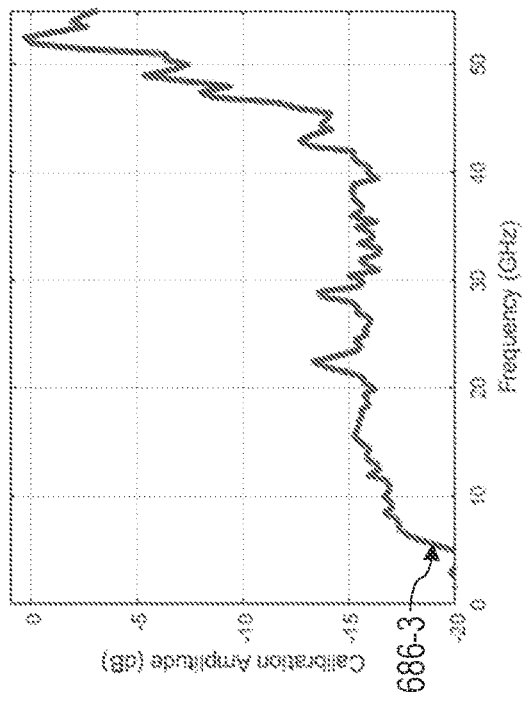
FIG. 17A
FIG. 17B
FIG. 17C
FIG. 17D

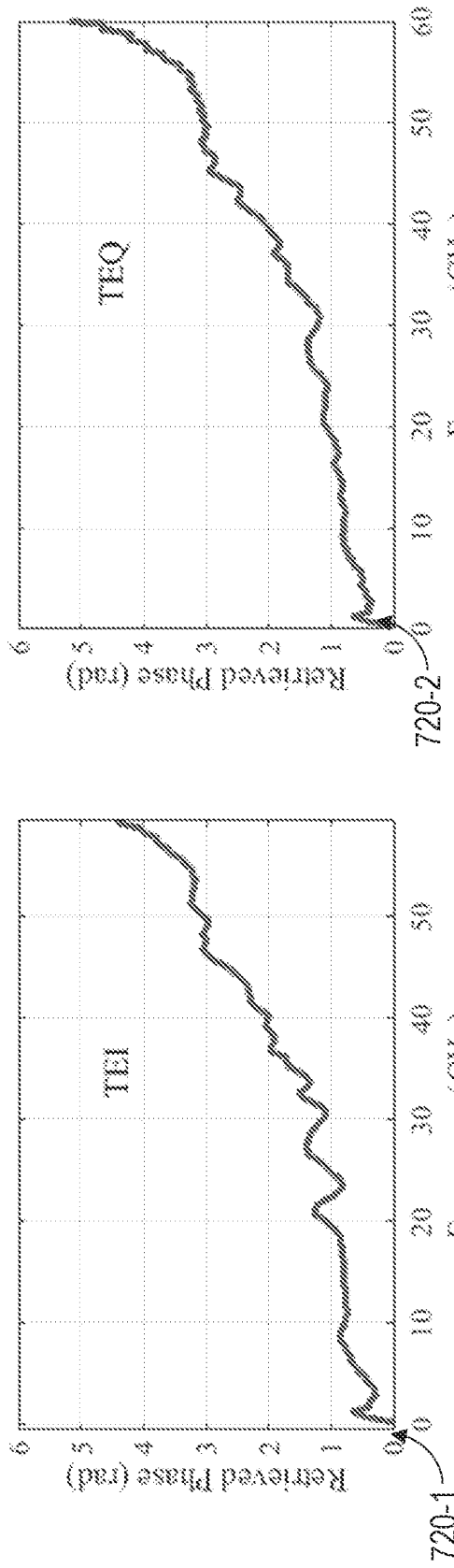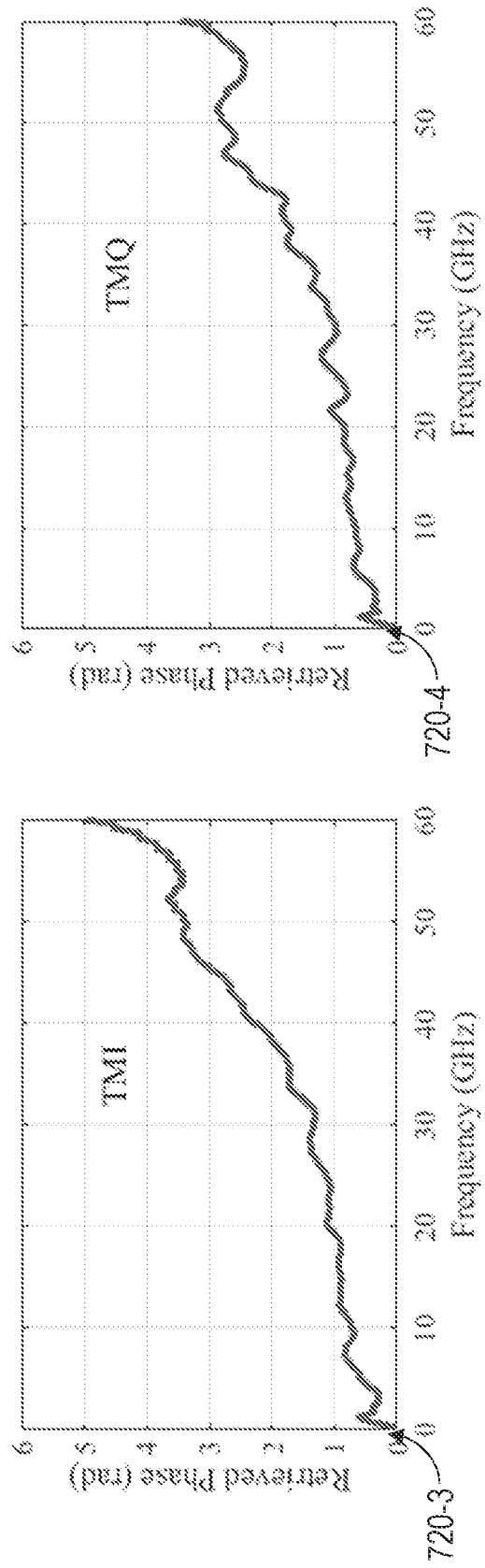
FIG. 18A  FIG. 18B  FIG. 18C  FIG. 18D

DIGITAL TONE-BASED APPARATUS AND METHOD FOR MEASURING THE FREQUENCY RESPONSE OF COHERENT OPTICAL TRANSMITTERS

CROSS REFERENCE TO RELATED APPLICATIONS

This application is a divisional of U.S. patent application Ser. No. 17/375,575, filed on Jul. 14, 2021, which claims the benefit under 35 U.S.C. § 119(e) to U.S. Provisional Patent Application No. 63/051,815, filed Jul. 14, 2020, both of which are incorporated herein by reference in its entirety.

BACKGROUND

Optical communication systems typically include a first node that supplies optical signals carrying user information or data to a second node that receives such optical signals via an optical communication path that connects the first node to the second node. In certain optical communication systems, the first node is a so-called hub node that communicates with a plurality of second nodes, also referred to as leaf nodes. The optical communication paths that connect the hub with multiple leaf nodes may include one or more segments of optical fiber connected to one another by various optical components or sub-systems, such as optical amplifiers, optical splitters and combiners, optical multiplexers and demultiplexers, and optical switches, for example, wavelength selective switches (WSS). The optical communication path and its associated components may be referred to as a line system.

In each node, the various electrical and optical components or sub-systems may introduce impairments in the transmitted optical signals, such as a linear time-invariant impairments, nonlinear impairments, etc. Generally, linear time-invariant impairments are the dominant impairment type. These impairments cause a magnitude response or a phase response, or both, in the transmitted optical signal, thereby degrading the optical signal and limiting the transmitter from using higher modulation schemes when modulating the optical signal, which may result in a lower quality transmission.

Thus, a need exists for a system and method to measure and mitigate the effects of impairments introduced to the optical signals. It is to such a system and method that the present disclosure is directed.

SUMMARY

The problem of mitigating the effects of impairments introduced to the optical signals is solved by introducing an AM tone and data to an optical modulator generating a modulated optical signal, measuring an amplitude response of the AM tone within the modulated optical signal, calculating a frequency response based on the amplitude response, and calibrating the optical modulator with the frequency response.

In some embodiments, the problem of mitigating the effects of impairments introduced to the optical signals is solved by a transmitter, comprising a laser operable to supply an optical signal; an AM signal generator operable to supply first electrical signals based on an AM tone having a first known carrier frequency component at a first period of time and a second known carrier frequency component at a second period of time, wherein the first known carrier frequency component is different from the second known carrier frequency component; digital-to-analog conversion circuitry operable to output second electrical signals based on the first electrical signals; modulator driver circuitry operable to output third electrical signals based on the second electrical signals; an optical modulator operable to modulate the optical signal based on the third electrical signals to supply a modulated optical signal, the modulated optical signal based on the AM tone; a photodetector operable to measure a power of the modulated optical signal; and a demodulation circuitry coupled to the photodiode and operable to determine an amplitude response using a first power of the modulated optical signal and the first known carrier frequency component at the first period of time and a second power of the modulated optical signal and the second known carrier frequency component at the second period of time, to calculate a frequency response based on the amplitude response, and to calibrate the optical modulator with the frequency response.

Other implementations are directed to systems, hub transceivers, devices, and non-transitory, computer-readable media having instructions stored thereon, that when executed by one or more processors, cause the one or more processors to perform operations described herein.

The details of one or more implementations of the subject matter described in this specification are set forth in the accompanying drawings and the description below. Other aspects, features and advantages of the subject matter will become apparent from the description, the drawings, and the claims.

BRIEF DESCRIPTION OF THE DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale or in schematic in the interest of clarity and conciseness. Not every component may be labeled in every drawing. Like reference numerals in the figures may represent and refer to the same or similar element or function. In the drawings:

FIGS. 17A-D are graphs of exemplary embodiments of a frequency response calibration based on the amplitude responses of FIGS. 16A-D.

FIGS. 18A-D are graphs of an exemplary embodiment of the phase response (in radians) for each amplitude response of FIGS. 16A-D.

Like reference numbers and designations in the various drawings indicate like elements.

DETAILED DESCRIPTION

Figure 1:
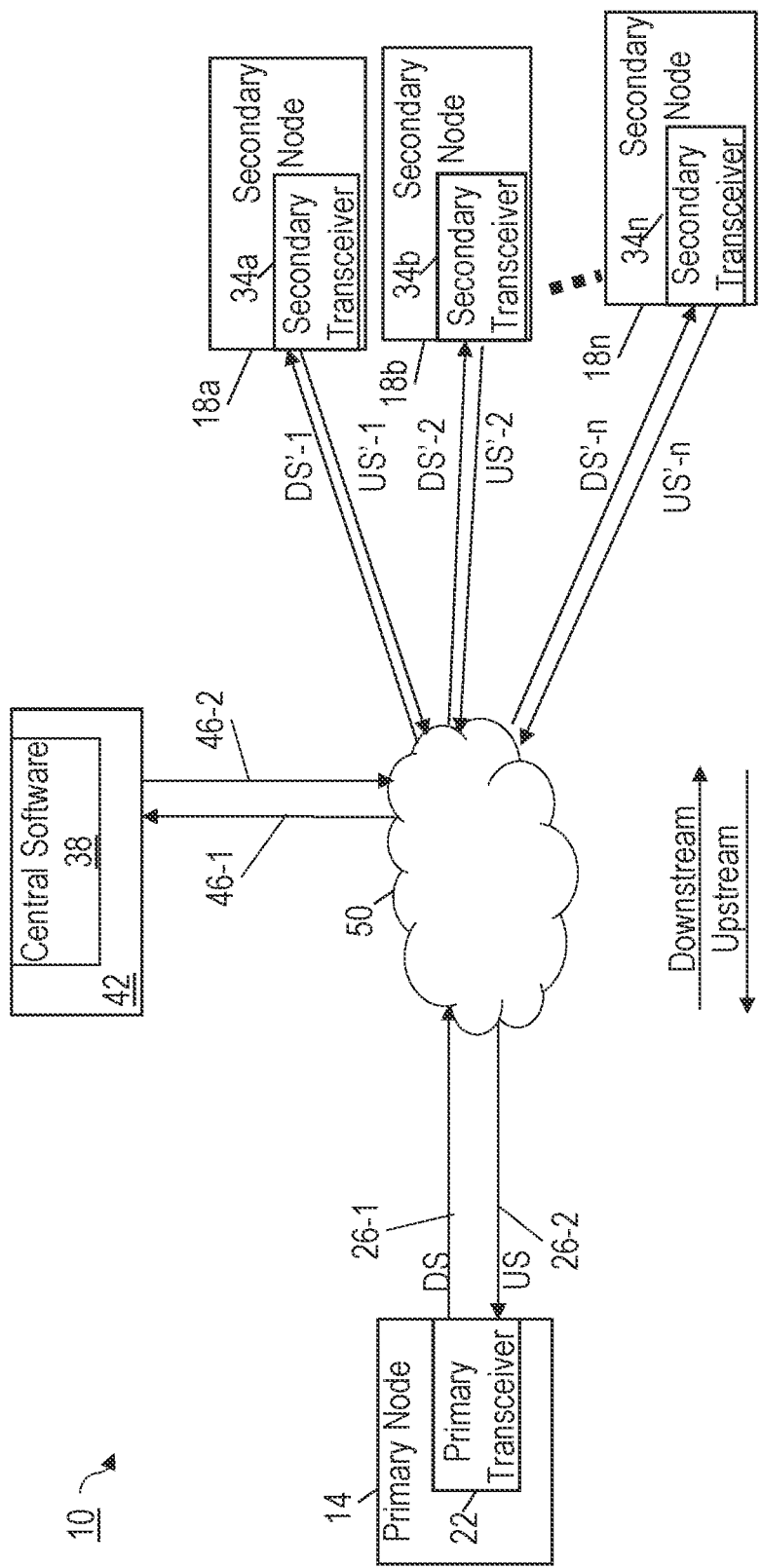
FIG. 1 is a block diagram of an exemplary embodiment of an optical communication system constructed in accordance with the present disclosure.

The following detailed description refers to the accompanying drawings. The same reference numbers in different drawings may identify the same or similar elements.

Before explaining at least one embodiment of the disclosure in detail, it is to be understood that the disclosure is not limited in its application to the details of construction, experiments, exemplary data, and/or the arrangement of the components set forth in the following description or illustrated in the drawings unless otherwise noted.

The disclosure is capable of other embodiments or of being practiced or carried out in various ways. Also, it is to be understood that the phraseology and terminology employed herein is for purposes of description and should not be regarded as limiting.

As used in the description herein, the terms "comprises," "comprising," "includes," "including," "has," "having," or any other variations thereof, are intended to cover a non-exclusive inclusion. For example, unless otherwise noted, a process, method, article, or apparatus that comprises a list of elements is not necessarily limited to only those elements but may also include other elements not expressly listed or inherent to such process, method, article, or apparatus.

Further, unless expressly stated to the contrary, "or" refers to an inclusive and not to an exclusive "or". For example, a condition A or B is satisfied by one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more, and the singular also includes the plural unless it is obvious that it is meant otherwise. Further, use of the term "plurality" is meant to convey "more than one" unless expressly stated to the contrary.

As used herein, qualifiers like "substantially," "about," "approximately," and combinations and variations thereof, are intended to include not only the exact amount or value that they qualify, but also some slight deviations therefrom, which may be due to computing tolerances, computing error, manufacturing tolerances, measurement error, wear and tear, stresses exerted on various parts, and combinations thereof, for example.

As used herein, any reference to "one embodiment," "an embodiment," "some embodiments," "one example," "for example," or "an example" means that a particular element, feature, structure or characteristic described in connection with the embodiment is included in at least one embodiment and may be used in conjunction with other embodiments. The appearance of the phrase "in some embodiments" or "one example" in various places in the specification is not necessarily all referring to the same embodiment, for example.

The use of ordinal number terminology (i.e., "first", "second", "third", "fourth", etc.) is solely for the purpose of differentiating between two or more items and, unless explicitly stated otherwise, is not meant to imply any sequence or order of importance to one item over another.

The use of the term "at least one" or "one or more" will be understood to include one as well as any quantity more than one. In addition, the use of the phrase "at least one of X, Y, and Z" will be understood to include X alone, Y alone, and Z alone, as well as any combination of X, Y, and Z.

Where a range of numerical values is recited or established herein, the range includes the endpoints thereof and all the individual integers and fractions within the range, and also includes each of the narrower ranges therein formed by all the various possible combinations of those endpoints and internal integers and fractions to form subgroups of the larger group of values within the stated range to the same extent as if each of those narrower ranges was explicitly recited. Where a range of numerical values is stated herein as being greater than a stated value, the range is nevertheless finite and is bounded on its upper end by a value that is operable within the context of the invention as described herein. Where a range of numerical values is stated herein as being less than a stated value, the range is nevertheless bounded on its lower end by a non-zero value. It is not intended that the scope of the invention be limited to the specific values recited when defining a range. All ranges are inclusive and combinable.

When values are expressed as approximations, by use of the antecedent "about," it will be understood that the particular value forms another embodiment. Reference to a particular numerical value includes at least that particular value, unless the context clearly dictates otherwise. The term "about" when used in reference to numerical ranges, cutoffs, or specific values is used to indicate that the recited values may vary by up to as much as 10% from the listed value. Thus, the term "about" is used to encompass variations of ±10% or less, variations of ±5% or less, variations of ±1% or less, variations of ±0.5% or less, or variations of ±0.1% or less from the specified value.

Circuitry, as used herein, may be analog and/or digital components, or one or more suitably programmed processors (e.g., microprocessors) and associated hardware and software, or hardwired logic. Also, "components" may perform one or more functions. The term "component," may include hardware, such as a processor (e.g., microprocessor), an application specific integrated circuit (ASIC), a field programmable gate array (FPGA), a combination of hardware and software, and/or the like. The term "processor" as used herein means a single processor or multiple processors working independently or together to collectively perform a task.

Software may include one or more computer readable instructions that when executed by one or more components cause the component to perform a specified function. It should be understood that the algorithms described herein may be stored on one or more non-transitory computer readable medium. Exemplary non-transitory computer readable mediums may include random access memory, read only memory, flash memory, and/or the like. Such non-transitory computer readable mediums may be electrically based, optically based, magnetically based, and/or the like. Further, the messages described herein may be generated by the components and result in various physical transformations.

The generation of laser beams for use as optical data carrier signals is explained, for example, in U.S. Pat. No. 8,155,531, entitled "Tunable Photonic Integrated Circuits", issued Apr. 10, 2012, and U.S. Pat. No. 8,639,118, entitled "Wavelength division multiplexed optical communication system having variable channel spacings and different modulation formats," issued Jan. 28, 2014, which are hereby fully incorporated in their entirety herein by reference.

Referring now to the drawings, and in particular to FIG. 1, shown therein is a diagram of an exemplary embodiment of an optical communication system 10 constructed in accordance with the present disclosure. The optical communication system 10 generally includes a primary node 14, such as a router, and one or more secondary node 18 shown as secondary nodes 18a-18n.

In one embodiment, the primary node 14 includes a primary transceiver 22 (or transceiver module) that is operable to supply a downstream optical signal (DS), including optical subcarriers, to an optical fiber link 26-1 (e.g., part of a first or downstream optical communication path), and receives an upstream signal (US) from an optical fiber link 26-2 (e.g., part of a second or upstream optical communication path). In one embodiment, the primary transceiver or primary transceiver 22 may be referred to as a hub transceiver or hub transceiver module. The downstream optical signal DS is fed by the optical fiber link 26-1 to one or more optical line system component, such as an optical amplifier, an erbium-doped fiber amplifier, an add-drop module, an optical gateway, a ROADM, and/or the like. As discussed in greater detail below with reference to FIG. 2, the optical signals DS and US may each include one or more optical subcarrier, such as a Nyquist optical subcarrier.

In one embodiment, the secondary node 18 includes a secondary transceiver 34 that is operable to transmit optical signals to the primary node 14 and to receive optical signals from the primary node 14. In one embodiment, the optical communication system 10 includes more than one primary node 14, each of which communicates with one or more secondary node 18.

In one embodiment, the primary transceiver 22 includes a transmitter, described below and shown in FIG. 4, that receives data and outputs an optical signal including one or more optical subcarrier. Each optical subcarrier is indicative of the transmitted data. In one embodiment, the primary node 14 includes more than one primary transceiver 22. In this embodiment, the transmitter 70 of each primary transceiver 22 supplies a corresponding optical signal with an associated group of subcarriers.

In one embodiment, each secondary node 18 may have a structure similar to the primary node 14 and may operate in a manner similar to that described above with respect to the primary node 14.

As further shown in FIG. 1, each secondary transceiver 34 may have a structure similar to and operate in manner similar to that described above with respect to the primary transceiver 22. In one example, however, each of the secondary transceivers 34 may supply a modulated optical signal US'-1 to US'-n in an upstream direction. Each such optical signal may include one or more optical subcarriers. Collectively, a number the optical subcarriers output from the secondary transceivers 34 may be equal to, less than, or greater than the number of optical subcarriers output from the primary transceiver 22.

The optical signals US'-1 to US'-n may be combined by a combiner in optical line system 50 and output towards the primary node 14 in combined form as the upstream optical signal US. The optical signal US may then be provided to the primary transceiver 22 via the optical fiber link 26-2.

Figure 2:
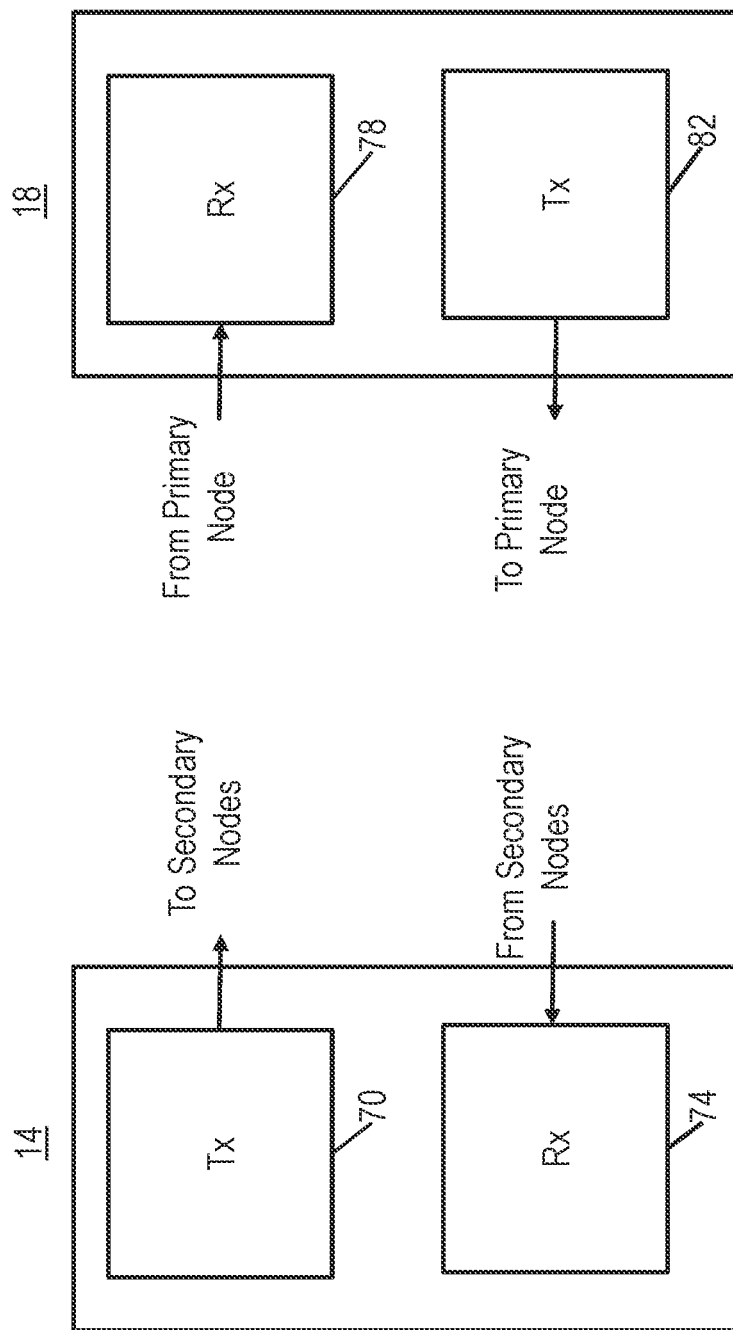
FIG. 2 is a block diagram of an exemplary embodiment of a primary node and a secondary node of FIG. 1 constructed in accordance with the present disclosure.

Referring now to FIG. 2, shown therein is a block diagram of an exemplary embodiment of the primary node 14 constructed in accordance with the present disclosure. The primary node 14 may include a transmitter 70 that supplies a downstream modulated optical signal including subcarriers, and a receiver that 74 that may receive upstream subcarriers carrying data originating from the secondary nodes 18, such as from secondary transceivers 34a-n. The transmitter 70 and the receiver 74, in one example, collectively constitute a primary node 14 or primary transceiver 22.

FIG. 2 further shows a block diagram of an exemplary embodiment of one of the secondary node 18a-n, which may include a receiver 78 that receives one or more downstream transmitted subcarriers, and a transmitter 82 that transmits one or more subcarriers in the upstream direction. Collectively, receiver 78 and transmitter 82 constitute a secondary node 18 or edge node transceiver.

Details of the transmitters 70, 82 and the receivers 74, 78 of the primary node 14 and the secondary node 18, respectively, are described in more detail below. It is understood that the transmitters 70, 82 have a similar structure and operate in a similar manner. Additionally, it is understood that the receivers 74, 78 have a similar structure and operate in a similar manner.

Figure 3A:
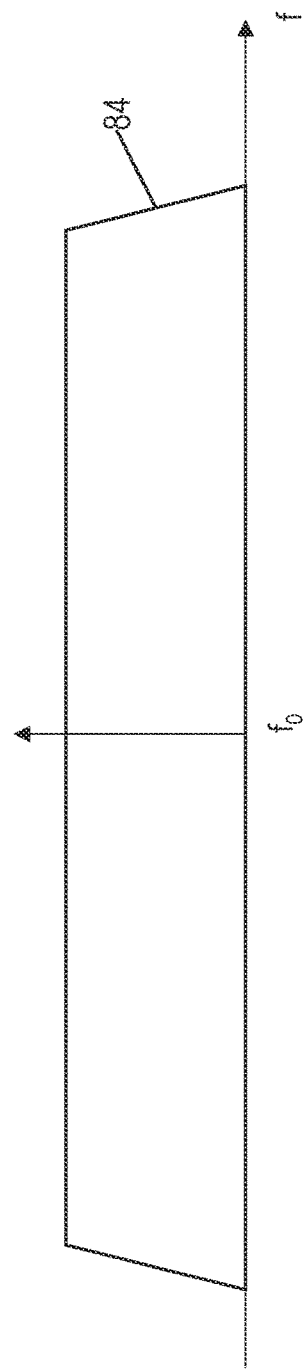
FIG. 3A is a diagram of an exemplary embodiment of an optical signal having a single subcarrier in accordance with the present disclosure.

Referring now to FIG. 3A, shown therein is a diagram of an exemplary embodiment of a single-carrier optical signal 84 constructed in accordance with the present disclosure. The single carrier optical signal 84 includes a single carrier, or a single subcarrier, that may be output be the transmitter 70 of the primary transceiver 22. The single carrier may be a Nyquist carrier and may have an optical spectral bandwidth that is at least equal to the Nyquist frequency, as determined by the baud rate of the single carrier. The single carrier may be centered around a frequency, $f_0$.

Figure 3B:
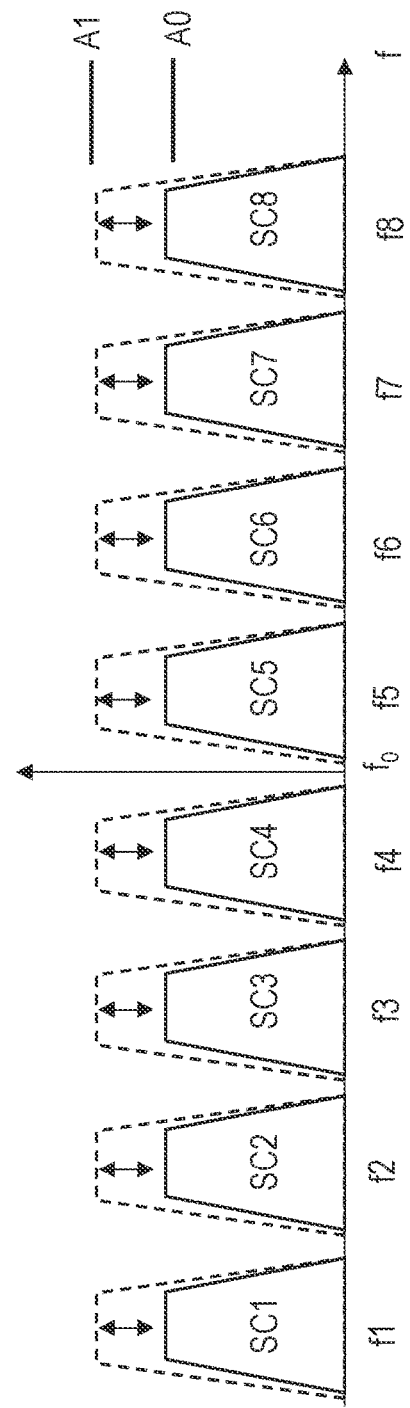
FIG. 3B is a diagram of an exemplary embodiment of an optical signal having multiple subcarriers in accordance with the present disclosure.

Referring now to FIG. 3B, shown therein is a diagram of an exemplary embodiment of an optical signal in accordance with the present disclosure. The optical signal includes a plurality of subcarriers, SC1 to SC8 that may be output by the transmitter 70 of the primary transceiver 22. Each of the subcarriers SC1 to SC8 may have a corresponding one of a plurality of frequencies f1 to f8. In addition, each of the subcarriers SC1 to SC8 may be a Nyquist subcarrier. In general, each subcarrier may have an optical spectral bandwidth that is at least equal to the Nyquist frequency, as determined by the baud rate of such subcarrier.

A Nyquist subcarrier is a group of optical signals, each carrying data, where (i) the spectrum of each such optical signal within the group is sufficiently non-overlapping such that the optical signals remain distinguishable from each other in the frequency domain, and (ii) such group of optical signals is generated by modulation of light from a single laser.

As discussed in greater detail below, the optical subcarriers SC1 to SC8 are generated by modulating light output from a laser. The frequency of such laser output light is $f_0$ and is typically a center frequency such that half the subcarrier subcarriers (e.g., f5 to f8) are above $f_0$, e.g., have a greater frequency than f0, and half the subcarrier frequencies (e.g., f1 to f4) are below $f_0$, e.g., have a lesser frequency than $f_0$.

As further shown in FIG. 3B, the amplitudes of the subcarriers SC1 to SC8 may be collectively or independently modulated together to vary the amplitude of each subcarrier between a first amplitude A1 and a second lower amplitude A0. When the subcarriers SC1 to SC8 each have an amplitude A1, a '1' bit, for example, is transmitted for line system management. On the other hand, when the subcarriers SC1 to SC8 each have an amplitude A0, a '0' bit, for example, is transmitted for line system management. In this manner, subcarrier modulation may be employed to transmit control information from the primary node transceiver 106, for example, to a line system component, as well as from the line system component to the primary transceiver 22. Communication from a line system component to a secondary transceiver 34 may be carried out by amplitude modulating an upstream optical signal (including subcarriers) at a line system component in accordance with certain control information followed by transmitting a polarization modulated signal carrying such control information from the primary transceiver 22 to the secondary transceiver 34.

Figure 4:
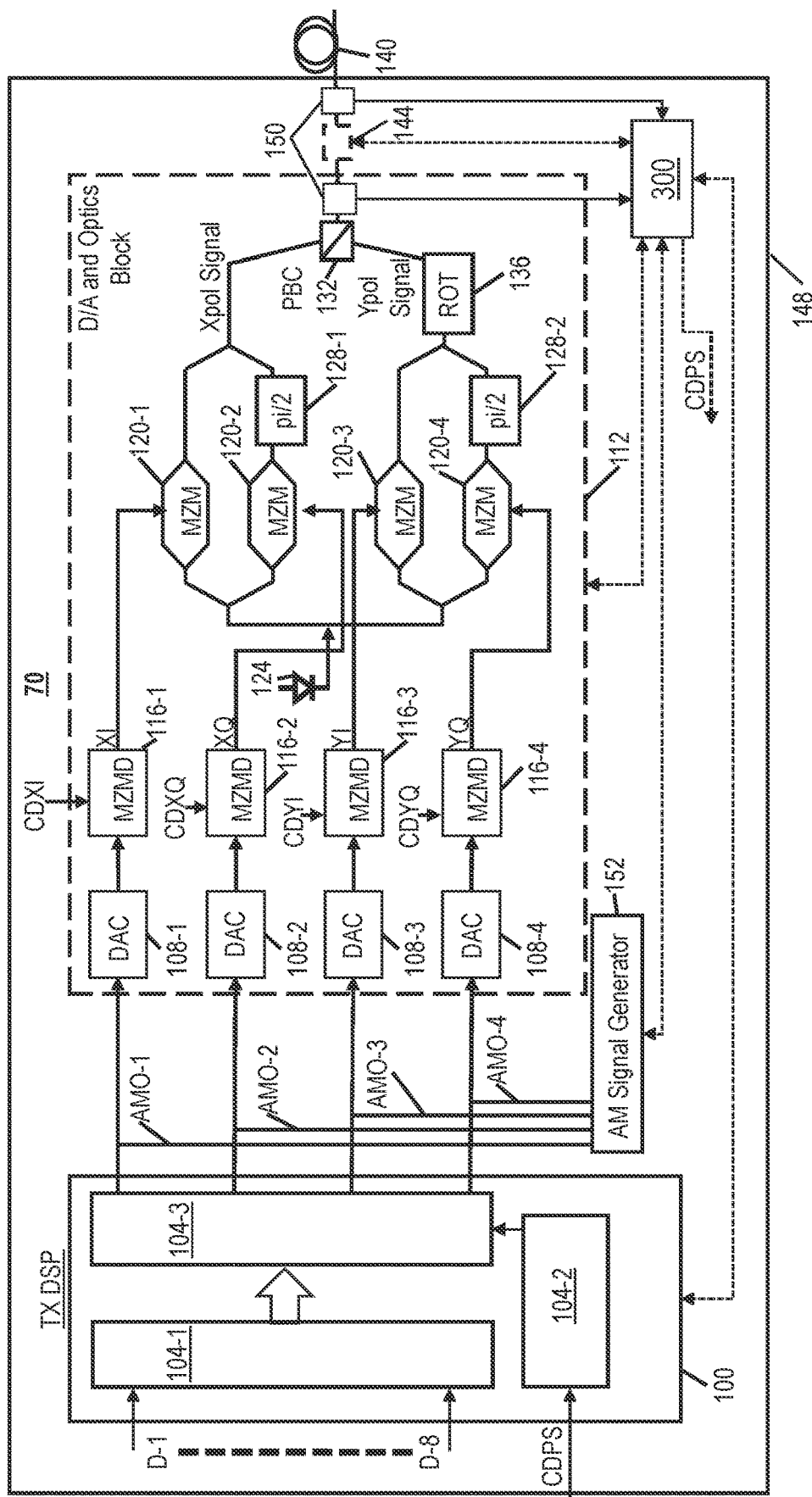
FIG. 4 is a block diagram of an exemplary embodiment a transmitter shown in FIG. 2 and constructed in accordance with the present disclosure.

Referring now to FIG. 4, shown therein is a diagram of an exemplary embodiment of the transmitter 70 constructed in accordance with the present disclosure. The transmitter 70 includes a digital signal processor (DSP 100) including circuit blocks 104-1, 104-2, and 104-3. In this example, the circuit block 104-1 receives data including one or more of eight data streams D1 to D8, each carrying user data or information. Such data is processed (e.g., as discussed in greater detail with respect to FIG. 6), and the processed data is provided to the circuit block 104-3. Second data, including, for example, control information, CDPS, destined for a downstream transceiver (e.g., the secondary transceivers 34) may be input to the circuit block 104-2, which processes such control information and supplies the control information to the circuit block 104-3.

As further shown in FIG. 4, the circuit block 104-3 supplies digital signals to DACs 108-1 to 108-4 of a D/A and Optics block 112. Each of the DACs 108 is a digital-to-analog conversion circuit and is operable to output first electrical signals based on the digital signals supplied by the DSP 100. The D/A and optics block 112 also includes modulator driver circuitry (MZMD 116-1 to 116-4). Each MZMD 116 is operable to output second electrical signals based on the first electrical signals received from a particular DAC 108.

The D/A and optics block 112 further includes optical modulator circuitry (MZM 120-1 to 120-4). Each MZM 120 is operable to output a first modulated optical signal or a second modulated optical signal based on the second electrical signals. The first modulated optical signal includes multiple optical subcarriers (e.g., the optical subcarriers SC1 to SC8) carrying user data to be transmitted between nodes of the optical communication system 10, and the second modulated optical signal is, for example, applying data to the orthogonal polarization, such as polarization multiplexing.

Figure 9:
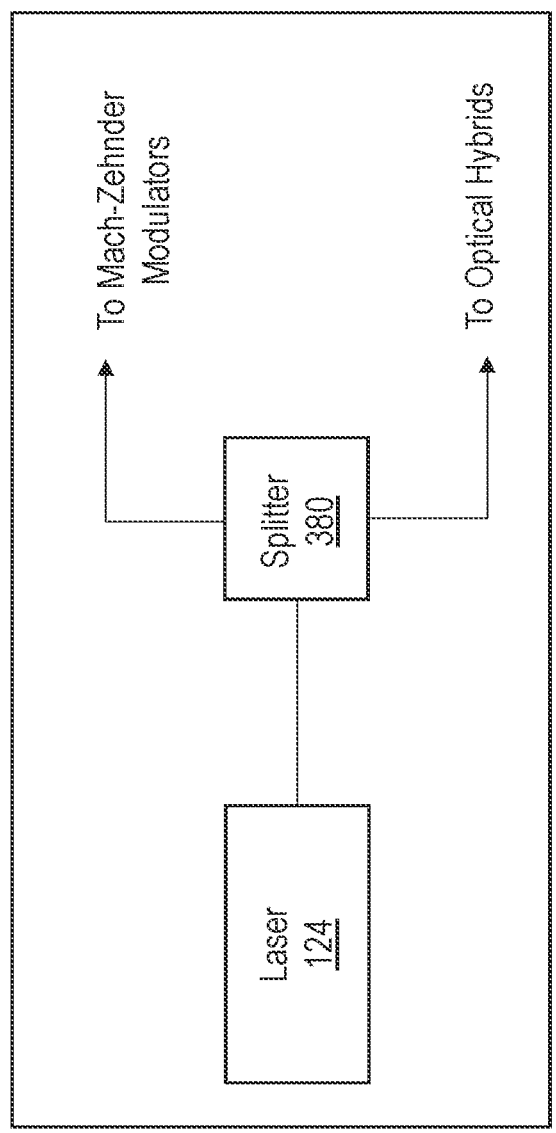
FIG. 9 is a diagram of an exemplary embodiment of a shared laser constructed in accordance with the present disclosure.

Each of the MZMs 120-1 to 120-4 of the D/A and optics block 112 may be a Mach-Zehnder Modulator (MZM) that modulates the phase and/or amplitude of the light output from a laser 124. As further shown in FIG. 4, a light beam output from the laser 124 (also included in the optics block 112) is split such that a first portion of the light is supplied to a first MZM pairing including the MZMs 120-1 and 120-2 and a second portion of the light is supplied to a second MZM pairing including the MZMs 120-3 and 120-4. The laser 124 can be a shared laser (as shown in FIG. 9), or an unshared laser where the transmitter 70 and the receiver 74 include separate lasers 124.

The first portion of the light is further split into third and fourth portions, such that the third portion is modulated by the MZM 120-1 to provide an in-phase (I) component of an X (or TE) polarization component of a modulated optical signal, and the fourth portion is modulated by the MZM 120-2 and fed to a phase shifter 128-1 to shift the phase of such light by 90 degrees in order to provide a quadrature (Q) component of the X polarization component of the modulated optical signal.

Similarly, the second portion of the light is further split into fifth and sixth portions, such that the fifth portion is modulated by the MZM 120-3 to provide an I component of a Y (or TM) polarization component of the modulated optical signal, and the sixth portion is modulated by the MZM 120-4 and fed to a phase shifter 128-2 to shift the phase of such light by 90 degrees to provide a Q component of the Y polarization component of the modulated optical signal.

The optical outputs of the MZMs 120-1 and 120-2 are combined to provide an X polarized optical signal including I and Q components and fed to a polarization beam combiner (PBC 132) provided in the optics block 112. In addition, the outputs of the MZMs 120-3 and 120-4 are combined to provide an optical signal that is fed to a polarization rotator 136, further provided in the optics block 112, that rotates the polarization of such optical signal to provide a modulated optical signal having a Y (or TM) polarization. The Y polarized modulated optical signal is also provided to a PBC 132, which combines the X and Y polarized modulated optical signals to provide a polarization multiplexed ("dual-pol") modulated optical signal onto an optical fiber 140. In some examples, the optical fiber 140 may be included as a segment of optical fiber in an example optical communication path of the optical communication system 10.

In some implementations, the polarization multiplexed optical signal output from the D/A and optics block 112 includes the optical subcarriers SC1-SC8 (e.g., of FIG. 3B), for example, such that each data subcarrier has X and Y polarization components and I and Q components.

In one embodiment, as shown in FIG. 4, each of the control signals CDXI, CDXQ, CDYI, and CDYQ may be supplied to respective one of the MZMD 116-1 to 116-4. These control signals are indicative of an amplitude modulation scalar, and, based on these control signals, the MZMD 116 may further adjust the analog signals received from the DACs 108 in accordance with the amplitude modulation scalar, such that the MZM 120 are driven in such a manner as to collectively amplitude modulate the subcarriers SC1 to SC8.

In another example, a plurality of optical components 144 may be provided to receive an optical signal including the optical subcarriers SC1 to SC8 output from the PBC 132. The optical components 144 may be any combination of a variable optical attenuator, an amplifier, an optical filter, such as a tunable filter, and/or the like. The optical component 144 may be operable to modify the optical signal output from the PBC 132. For example, if the optical component is a VOA, the VOA may be operable to adjust or vary the attenuation of the optical signal. By varying the attenuation experienced by the optical subcarriers SC1 to SC8, the amplitude or intensity of such subcarriers may be adjusted or controlled, such that the subcarriers SC1 to SC8 are amplitude modulated.

The transmitter 70 may be provided in the module 148, which may also house a receiver 74 of the primary transceiver 22 of the primary node 14. Although the optical components block 144 is shown inside the module 148, it is understood that the optical components 144 may be provided outside the module 148.

In one embodiment, the transmitter 70 includes one or more optical tap 150 disposed between the PBC 132 and the optical fiber 140 and in optical communication to receive a portion of the optical signal from the PBC 132. In the embodiment where the optical components 144 is included in the transmitter 70, the optical tap 150 may be disposed between the optical components 144 and the PBC 132 and/or disposed between the optical components 144 and the output optical fiber 140. As shown in greater detail below in reference to FIG. 8, the optical tap 150 may be used to direct a portion of the optical signal to a photodetector 332 and a demodulation circuitry 324 of a controls and monitoring circuit 300.

In one embodiment, amplitude-modulated (AM) tones maybe added to the data coming from the DSP 104-3 by providing an AM signal generator 152 which provides each of outputs AMO-1 to AMO-4 to a respective input of the DACs 108-1 to 108-4. These signals are generated in such a way that the DACs 108 output analog signals that include the AM tone overlaying or superimposed on the data carrying DAC outputs. Based on such DAC outputs, the MZMDs 116, in turn, output drive signal to the MZMs 120, as noted above. Accordingly, the combined MZM outputs supply optical subcarriers are superimposed with the AM tone based on the outputs AMO-1 to AMO-4 of the AM signal generator 152. Both X and Y polarization components and both components I and Q of each polarization are capable of such AM tones being added to the high-speed data. In one embodiment, both X and Y polarization components and both I and Q components include a single AM tone, whereas in other embodiments, both X and Y polarization components and both I and Q components include a plurality of AM tones.

While the AM signal generator 152 is shown in FIG. 4 as a single device, in one embodiment, the AM signal generator 152 could be more than one device. For example, a first AM signal generator could be implemented, similar in construction to the AM signal generator 152 to supply the output AMO-1 and the output AMO-2, while a second AM signal generator could be implemented, similar in construction to the AM signal generator 152 to supply the output AMO-3 and the output AMO-4. In another embodiment, a first AM signal generator could be implemented, similar in construction to the AM signal generator 152 to supply a first output while a second AM signal generator could be implemented to supply a second output, the first output and the second output are combined to form the AMO, such as the AMO-1 input to the DAC 108-1. In yet another embodiment, a plurality of AM signal generators may be implemented to supply an output, the output of each of the plurality of AM signal generators may be combined to form the AM, such as the AMO-1 input to the DAC 108-1.

In other embodiments, each DAC 108 is associated with a different AM signal generator 152 to provide an output AMO to the particular DAC 108. In one embodiment, the primary transceiver 22 may share a single AM signal generator between multiple transmitters 70. Similarly, in some embodiments, the primary node 14 may share a single AM signal generator between multiple primary transceivers 22.

The controls and monitoring circuit 300 is in communication with the one or more optical tap 150 to receive the portion of the optical signal from the PBC 132 to monitor the optical signal. In one embodiment, the controls and monitoring circuit 300 may also be in communication with one or more of the optical components 144, the D/A and Optics Block 112, the AM signal generator 152, and the DSP 100. In one embodiment, the controls and monitoring circuit 300 outputs the CDPS signal as received by the block 104-2. In one embodiment, the controls and monitoring circuit 300 communicates with the DSP 100 and optical component 144 to control various settings, such as, VOA setting, amplifier setting, MZM bias, AM signal generator, CDPS data, laser control, and the like, or some combination thereof.

Figure 5:
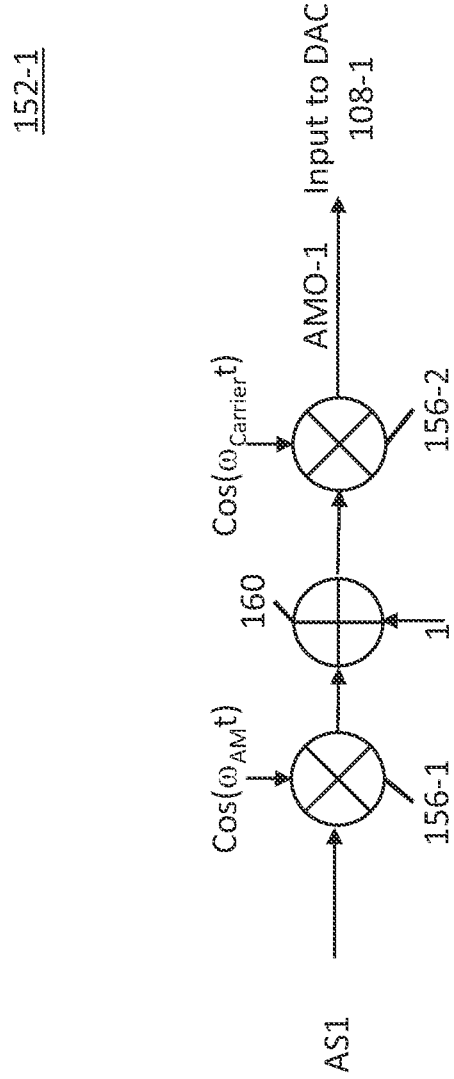
FIG. 5 is a diagram of an exemplary embodiment of an AM signal generator constructed in accordance with the present disclosure.

Referring now to FIG. 5, shown therein is a diagram of an exemplary embodiment of an AM signal generator 152-1 similar to the AM signal generator 152 of FIG. 4, constructed in accordance with the present disclosure. In this embodiment, the AM signal generator 152-1 receives an AM amplitude setting AS1, i.e., a scalar value between 0 and 1, which may be multiplied, with a multiplier 156-1, by a cosine function, $\cos(\omega_{AM} t)$, where $\omega_{AM}$ is indicative of a frequency of the amplitude modulation (in rad/s) and is selectable by the user or selected by the controls and monitoring circuit 300 and where t is a sampling time dependent on a sampling rate of the DSP 100 or the DAC resulting in discrete steps of, for example only, 10 ps. The resulting product is output from the multiplier 156-1 and provided to an adder circuit 160, which adds one to the product output from the multiplier 156-1. The output or sum of the adder circuit 160 is next provided to a multiplier circuit 156-2, which multiplies such sum by another cosine function, $\cos(\omega_{Carrier}t)$, where $\omega_{Carrier}$ is a carrier frequency (in rad/s) and t is a sampling time as described above. In one example, $\omega_{Carrier}$ is equal to zero. In other examples, $\omega_{Carrier}$ is selected from a frequency in the range of about 0.5 GHz to about 50 GHz; however, the frequency may be selected or provided by a user or controls and monitoring circuit 300. The resulting product (AMO-1) is added or combined with a corresponding output of the DSP 100 and input to the DAC 108-1. In one embodiment, the sampling time, t, is dependent on the sampling rate, for example, if the sampling rate is 100 giga-samples per second, then t includes every step of time, starting at 0, until termination of sampling, e.g., 0 s, 10 ps, 20 ps, 30 ps, etc.

In one embodiment, $\omega_{AM}$ is much smaller than $\omega_{Carrier}$, such as a frequency selected from the range of about 0 MHz to about 50 MHz. In one embodiment, $\omega_{AM}=2\pi f_{AM}$. Where $f_{AM}$ is the AM frequency of the tone in Hz.

It is understood that the AM signal generator 152 may include circuitry similar to the AM signal generator 152-1 shown in FIG. 5 to provide similar signals (AMO-2 to AMO-3) to the inputs of remaining the DACs 108-2 to 108-4.

Figure 14:
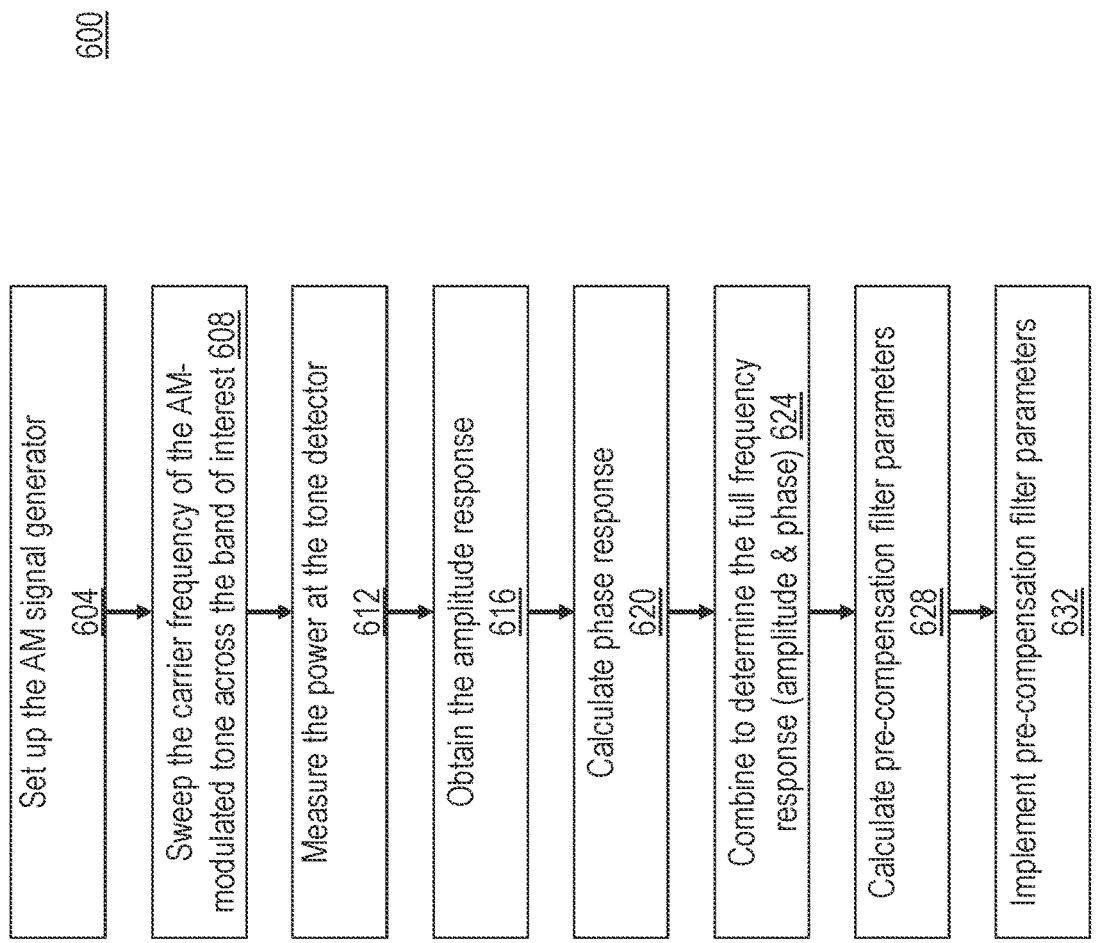
FIG. 14 is a process flow diagram of an exemplary embodiment of a frequency response determination process in accordance with the present disclosure.

In one embodiment, the AM signal generator 152 may supply a first AM tone for a first period of time and a second AM tone for the second period of time. For example, the first AM tone may have a first $\omega_{AM-1}$ and a first $\omega_{Carrier-1}$ at the first period of time and the AM tone may have a second $\omega_{AM-2}$ and a second $\omega_{Carrier-2}$ at the second period of time. In some embodiments, the first period of time and the second period of time are the same amount of time. In some embodiments, the first $\omega_{AM}$ and the second $\omega_{AM}$ are the same, however in other embodiments the first $\omega_{AM}$ and the second $\omega_{AM}$ are different. In some embodiments, the first $\omega_{Carrier}$ and the second $\omega_{Carrier}$ are the same, however in other embodiments, the second $\omega_{Carrier}$ and the second $\omega_{Carrier}$ are the same. In one embodiment, the controls and monitoring circuit 300 controls the AM signal generator 152 as part of a frequency response determination process 600 as shown in FIG. 14.

Figure 6:
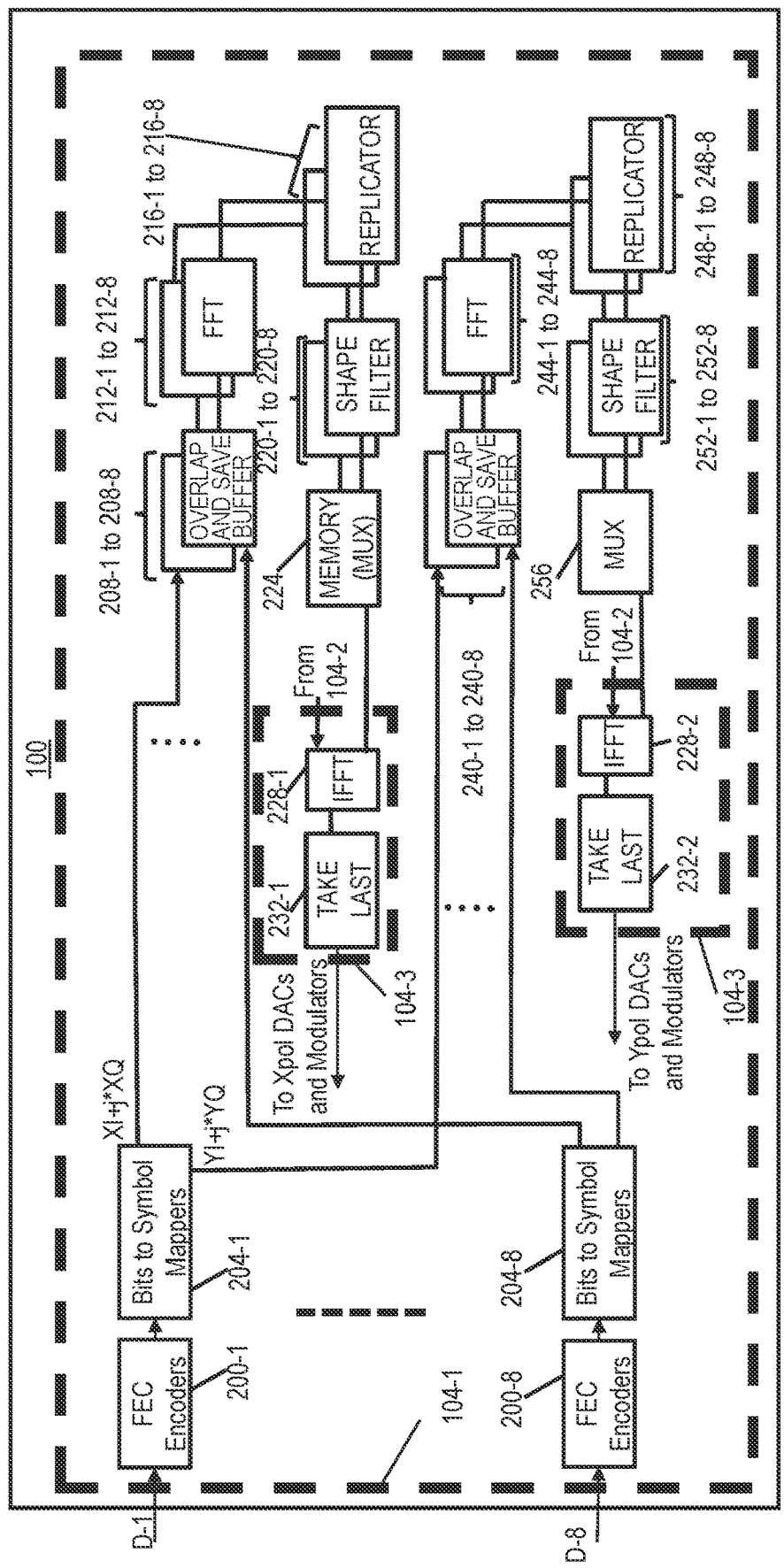
FIG. 6 is a block diagram of an exemplary embodiment of a DSP of the transmitter shown in FIG. 2 and constructed in accordance with the present disclosure.

Referring now to FIG. 6, shown therein is a block diagram of an exemplary embodiment of the DSP 100 of FIG. 4, including circuit blocks 104-1 and circuit blocks 104-3, in greater detail. As noted above, the circuit block 104-1 receives user data streams or inputs D1 to D8. A shown in FIG. 5, each such data stream is supplied to a respective one of the forward error correction encoders (FEC encoders 200-1 to 200-8). The FEC encoders 200-1 to 200-8 carry out forward error correction coding on a corresponding one of the switch outputs, such as, by adding parity bits to the received data. The FEC encoders 200-1 to 200-8 may also provide timing skew between the subcarriers to correct for skew introduced during transmission over one or more optical fibers. In addition, the FEC encoders 200-1 to 200-8 may interleave the received data.

Each of the FEC encoders 200-1 to 200-8 provides an output to a corresponding one of multiple bits to symbol circuits, 204-1 to 204-8 (collectively referred to herein as "204"). Each of the bits to symbol circuits 204 may map the encoded bits to symbols on a complex plane. For example, the bits to symbol circuits 204 may map four bits to a symbol in a dual-polarization Quadrature Phase Shift Keying (QPSK) or an m-quadrature amplitude modulation (m-QAM, m being a positive integer) constellation, such as 8-QAM, 16-QAM, 32-QAM, 64-QAM, and 128-QAM or a greater m-quadrature amplitude modulation. Each of the bits to symbol circuits 204 provides first symbols, having the complex representation XI+j*XQ, associated with a respective one of the data input, such as D1. Data indicative of such first symbols may be carried by the X polarization component of each subcarrier SC1-SC8.

Each of the bits to symbol circuits 204 may further provide second symbols having the complex representation YI+j*YQ, also associated with a corresponding one of the data inputs D1 to D8. Data indicative of such second symbols, however, is carried by the Y polarization component of each of the subcarriers SC1-SC8.

As further shown in FIG. 6, each of the first symbols output from each of the bits to symbol circuits 204 is supplied to a respective one of first overlap and save buffers 208-1 to 208-8 (collectively referred to herein as overlap and save buffers 208) that may buffer 256 symbols, for example, however, in other embodiments, a greater or fewer number of symbols may be buffered. Each of the overlap and save buffers 208 may receive 128 of the first symbols or another number of such symbols at a time from a corresponding one of bits to symbol circuits 204. Thus, the overlap and save buffers 208 may combine 128 new symbols from the bits to symbol circuits 204, with the previous 128 symbols received from the bits-to-symbol circuits 204.

Each overlap and save buffer 208 supplies an output, which is in the time domain, to a corresponding one of the fast Fourier Transform (FFT) circuits 212-1 to 212-8 (collectively referred to as "FFTs 212"). In one example, the output includes 256 symbols or another number of symbols. Each of the FFTs 212 converts the received symbols to the frequency domain using or based on, for example, a fast Fourier transform. Each of the FFTs 212 may include 256, for example, memories or registers, also referred to as frequency bins or points, that store frequency components associated with the input symbols.

Each of the replicator components 216-1 to 216-8 may replicate the 256 frequency components associated with of the FFTs 212 and store such components in 512 or another number of frequency bins (e.g., for T/2 based filtering of the subcarrier) in a respective one of the plurality of replicator components. Such replication may increase the sample rate. In addition, replicator components 216-1 to 216-8, or circuits, may arrange or align the contents of the frequency bins to fall within the bandwidths associated with shape filter circuits 220-1 to 220-8 described below.

In one embodiment, each of the shape filter circuits 220-1 to 220-8 may apply a pulse shaping filter to the data stored in the 512 frequency bins of a respective one of the plurality of replicator components 216-1 to 216-8 to thereby provide a respective one of multiple filtered outputs, which are multiplexed and subject to an inverse FFT, as described below. The shape filter circuits 220-1 to 220-8 calculate the transitions between the symbols and the desired subcarrier spectrum so that the subcarriers can be spectrally packed together for transmission (e.g., with a close frequency separation). The shape filter circuits 220-1 to 220-8 may also be used to introduce timing skew between the subcarriers to correct for timing skew induced by links between nodes shown in FIG. 1, for example.

In one embodiment, the shape filter circuits 220-1 to 220-8 may further include a frequency domain equalizer filter, pre-compensation filter, and/or a CD filter, discussed in more detail below in reference to FIGS. 13-15. The shape filter circuits 220-1 to 220-8 having a frequency domain equalizer filter, pre-compensation filter, or a CD filter may be referred to as an FDEQ filter. The FDEQ filter may be used to apply a frequency response (discussed in more detail below) to the shape the subcarriers or the subcarrier spectrum.

In one embodiment, the shape filter circuits 220-1 to 220-8 may further receive an array of amplitude and/or phase values, such as from the amplitude response and/or phase response derived below) and apply the amplitude and/or phase values to the spectrum of each subcarrier of the optical signal.

In one embodiment, a memory component 224, which may include a multiplexer circuit or memory, may receive the filtered outputs from the shape filter circuits 220-1 to 220-8, and multiplex or combine such outputs together to form an element vector.

The output of the memory component 224 is fed to the circuit block 104-3, which includes, in this example, an IFFT circuit 228-1. The IFFT circuit 228-1 may receive the element vector and provide a corresponding time domain signal or data based on an inverse fast Fourier transform (IFFT). In one example, the time domain signal may have a rate of 64 G Sample/s. A take last buffer or memory circuit 232-1 may select the last 1024 or another number of samples from an output of the IFFT circuit 228-1 and supply the samples to a downstream node at 64 G Sample/s, for example.

As further shown in FIG. 6, each of the bits to symbol circuits 204-1 to 204-8 outputs a corresponding one of symbols indicative of data carried by the Y polarization component of the polarization multiplexed modulated optical signal output on the optical communication path or optical fiber 140. As further noted above, these symbols may have the complex representation YI+j*YQ. Each such symbol may be processed by a respective one of the overlap and save buffers 240-1 to 240-8, a respective one of the FFT circuits 244-1 to 244-8, a respective one of the replicator components or circuits 248-1 to 248-8, the shape filter circuits 252-1 to 252-8, and the multiplexer or memory 256 of block the 104-1. Moreover, the output of the multiplexer or memory 256 may be fed to the circuit block 104-3, which further includes a IFFT 228-2, and a take last buffer or memory circuit 232-2, to provide processed symbols having the representation YI+j*YQ in a manner similar to or the same as that discussed above in generating processed symbols XI+j*XQ output from the memory circuit 232-1. In addition, symbol components YI and YQ are provided to the downstream node.

While FIG. 6 shows the Tx DSP 100 as including a particular quantity and arrangement of functional components, in some implementations, the DSP 100 may include additional functional components, fewer functional components, different functional components, or differently arranged functional components. In addition, typically the number of overlap and save buffers, FFTs, replicator circuits, and pulse shape filters associated with the X component may be equal to the number of data inputs, and the number of such circuits associated with the Y component and may also be equal to the number of switch outputs. However, in other examples, the number of data inputs may be different than the number of these circuits. As noted above, based on the outputs of the MZMDs 116-1 to 116-4, multiple optical subcarriers SC1 to SC8 may be output onto the optical fiber 140.

Figure 7:
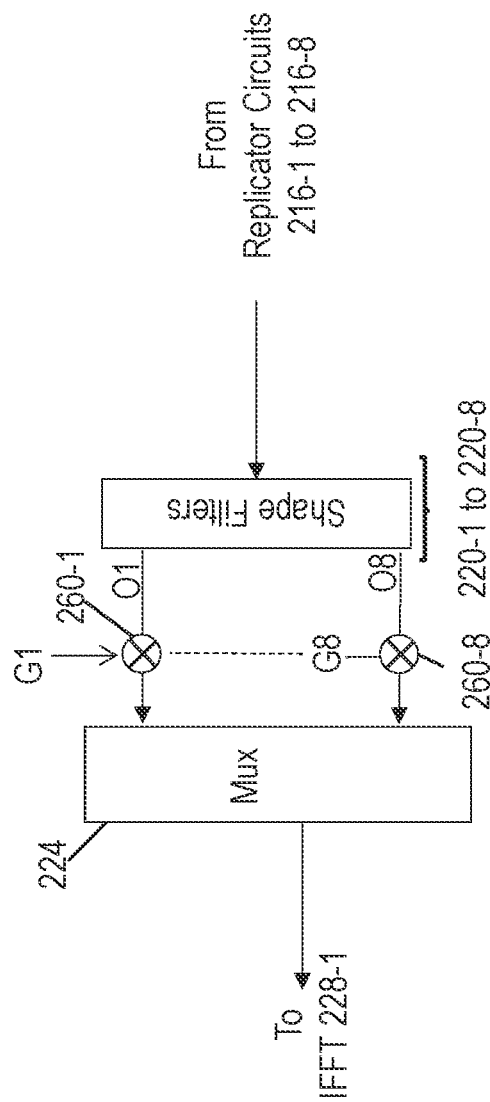
FIG. 7 is a diagram of an exemplary embodiment of the shaping filter and subcarrier multiplexing circuitry of the transmitter constructed in accordance with the present disclosure.

Referring now to FIG. 7, shown therein is a plurality of multiplier circuits 260-1 to 260-8, which may be complex multiplier circuits, are provided within the DSP 100, to receive a respective one of outputs O1 to O8 from a corresponding one of the shape filter circuits 220-1 to 220-8. Each of the multiplier circuits 260-1 to 260-8 receives a corresponding one of gain parameters G1 to G8 (i.e., a scalar), such that, in this example, each of the outputs O1 to O8 is multiplied by a corresponding one of the gain parameters G1 to G8. Each output O1 to O8 is associated with a respective one of the subcarriers SC1 to SC8. Moreover, each is associated with a gain or amplitude of a respective one of the subcarriers. That is, the amplitude of each of the optical subcarriers SC1 to SC8 output from the MZM 120 may be based on the gain parameters G1 to G8. Thus, by varying the gain parameters G1 to G8, the amplitude of the optical subcarriers SC1 to SC8 may also be varied or modulated. The gain parameters G1 to G8, may therefore be adjusted or controlled to adjust the power of the subcarriers SC1 to SC8.

In some implementations, the gain of each multiplier 260 is software programmable (or may be implemented in firmware) along with a frequency shaping function in the filter circuit 220 preceding the multiplexing performed by the multiplexer or memory component 224.

In one embodiment, in the example shown in FIG. 7, the gain parameter changes or variations are synchronized to occur at the same time or substantially the same time so that the amplitudes of the subcarriers SC1 to SC8 vary at the same time or substantially the same time. Moreover, the above-described multiplier circuits 260 may be included in the DSP 100 to adjust the power of the X polarization component of each of the subcarriers SC1 to SC8. It is understood that similar multiplier circuits may be provided between the shape filters 252 and the memory 256 to provide corresponding power adjustment of the Y polarization component of each subcarrier SC1 to SC8.

In one embodiment, the gain parameters may be used as limited pre-compensation filter parameters for each subcarrier SC1 to SC8. In other words, adjusting the gain parameters may adjust an average power of a subcarrier. This embodiment, however, cannot mitigate power variance within any particular subcarrier.

As discussed in greater detail below, optical subcarriers may be selectively output by primary transceivers 22 and/or secondary transceivers 34. The number of optical subcarriers that may be output, however, can vary over time in accordance with bandwidth of data capacity requirements of the transceiver. For example, if at one point in time, network bandwidth requirements are such that transceiver 34*a* transmits 200 Gbit/s to primary transceiver 22, and, each subcarrier carries data associated with 100 Gbit/s transmission, transceiver 34*a* outputs two optical subcarriers (2 subcarriers×100 Gbit/s).

As noted above, however, bandwidth requirements are often not static. Accordingly, in the current example, at another point in time, the network capacity requirements may be such that transceiver 34*a* transmits 100 Gbit/s to primary transceiver 22. As a result, transceiver 34*a*, turns off or cancels one of the subcarriers that previously had been transmitted. On the other hand, if, for example, additional bandwidth or capacity is required to be output from transceiver 34*a*, instructions may be provided to increase the number of optical subcarriers output from transceiver 34*a*.

Figure 8:
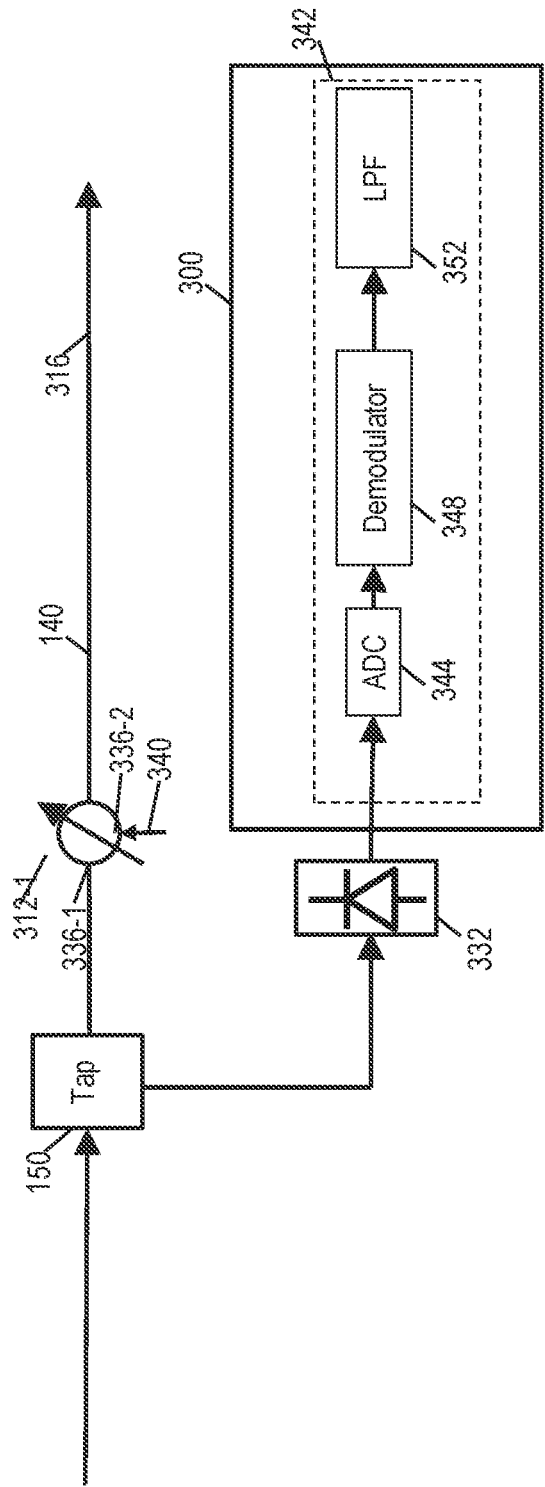
FIG. 8 is a diagram of an exemplary embodiment of a controls and monitoring circuit of FIG. 1 and constructed in accordance with the present disclosure.

Referring now to FIG. 8, shown therein is a diagram of an exemplary embodiment of the controls and monitoring circuit 300 constructed in accordance with the present disclosure. The controls and monitoring circuit 300 generally includes a demodulation circuitry 342, which may be implemented on a microprocessor, FPGA, ASIC, circuitry, and/or the like. In some implementations, one or more of the components of the controls and monitoring circuit 300 can be placed at various locations within the primary node 14 or the secondary node 18 of the optical communication system 10.

While FIG. 8 shows the control and monitoring circuitry 300 as including a particular quantity and arrangement of functional components, in some implementations, the control and monitoring circuitry 300 may include additional functional components, fewer functional components, different functional components, or differently arranged functional components. For example, the controls circuit 300 may have one or more additional component providing additional functionality, such as power monitoring, power control, laser control, MZM control, alarm monitoring, and/or the like.

Detection of an AM tone applied from the AM signal generator 152 generated at the transmitter 148 of a near end transceiver, primary transceiver 22, will next be described. The optical signal is input to an optical tap 150, which may provide an optical power split portion of the optical signal (e.g., 1% to 10%) to a photodetector 332, which may be a photodiode or other device operable to detect a power of the optical signal. A remaining portion of the optical signal continues to propagate along optical communication path 316 via the fiber optical 140. A VOA 312-1 or other optical component 144 may optionally be provided for processing the output signal. For example, the VOA 312-1 can receive the signal output by the optical tap 150 via an optical input port 336-1, and attenuate the signal according to an analog signal 340 received via the optical input port 336-2. In one embodiment, as described above, the optical tap 150 may be placed after the VOA 312-1. In one embodiment, the VOA 312-1 is set to a fixed gain. In this manner, the gain of the VOA 312-1 will not compromise detection of a frequency response.

As further shown in FIG. 8, the tapped portion of the optical signal is converted by the photodetector 332 to a corresponding analog electrical signal (e.g., a voltage or a current). The analog signal is fed to a demodulation circuitry 342 comprising an ADC 344, which supplies digital signals based on the received analog electrical signal, a demodulator 348, and a low pass filter 352. Such digital signals are optionally provided to the demodulator 348 and then output to a low pass filter 352, which outputs an amplitude response based on the AM tone. The amplitude response is a signal difference from the AM tone caused by impairments in transmitter side optical components before the optical signal proceeds down the optical fiber 140. The ADC 344 converts the analog signal into the digital domain.

In one embodiment, the amplitude response is one component of the frequency response caused by impairments in components of the primary node 14, primary transceiver 22, and/or transmitter 70. The amplitude response, in conjunction with a phase response, comprise the frequency response. The frequency response is a linear time-invariant impairment of the primary node 14, primary transceiver 22, and/or transmitter 70. Linear time-invariant impairments may be caused by components such as the DAC 108, traces and/or cables between components, the MZMD 116, MZM frequency roll-off, echoes in the transmitter 70 (e.g., caused by impedance mismatch), ripple in the spectral response, skew, any non-linear phase response, MZMD 116 peaking, low latency attenuation, and the like. Additionally, the frequency response may be temperature dependent, that is, the frequency response may change based on a temperature of the transmitter 70 and/or other components of the primary transceiver 22. The frequency response may also be age dependent, that is, the frequency response may change based on an age of the transmitter 70 and/or other components of the primary transceiver 22. The frequency response may also be optical laser frequency dependent, that is, the frequency response may change based on the operational laser frequency of the transmitter 70 and/or other components of the primary transceiver 22.

Referring now to FIG. 9, shown therein is a diagram of an exemplary embodiment of a shared laser constructed in accordance with the present disclosure. In this embodiment, the laser 124 is provided that is "shared" between the transmitter 70 and the receiver 74 in the primary transceivers 22 or between the receiver 78 and the transmitter 82 of the secondary transceiver 34. For example, a splitter 380 can provide a first portion of light output from the laser 124 to the MZMs 120 in the transmitter portion of the transmitter 70. Further, the splitter 380 can provide a second portion of such light acting as a local oscillator signal fed to 90-degree optical hybrids in the receiver 74 of the transmitter 70, as shown in FIG. 9.

Figure 10:
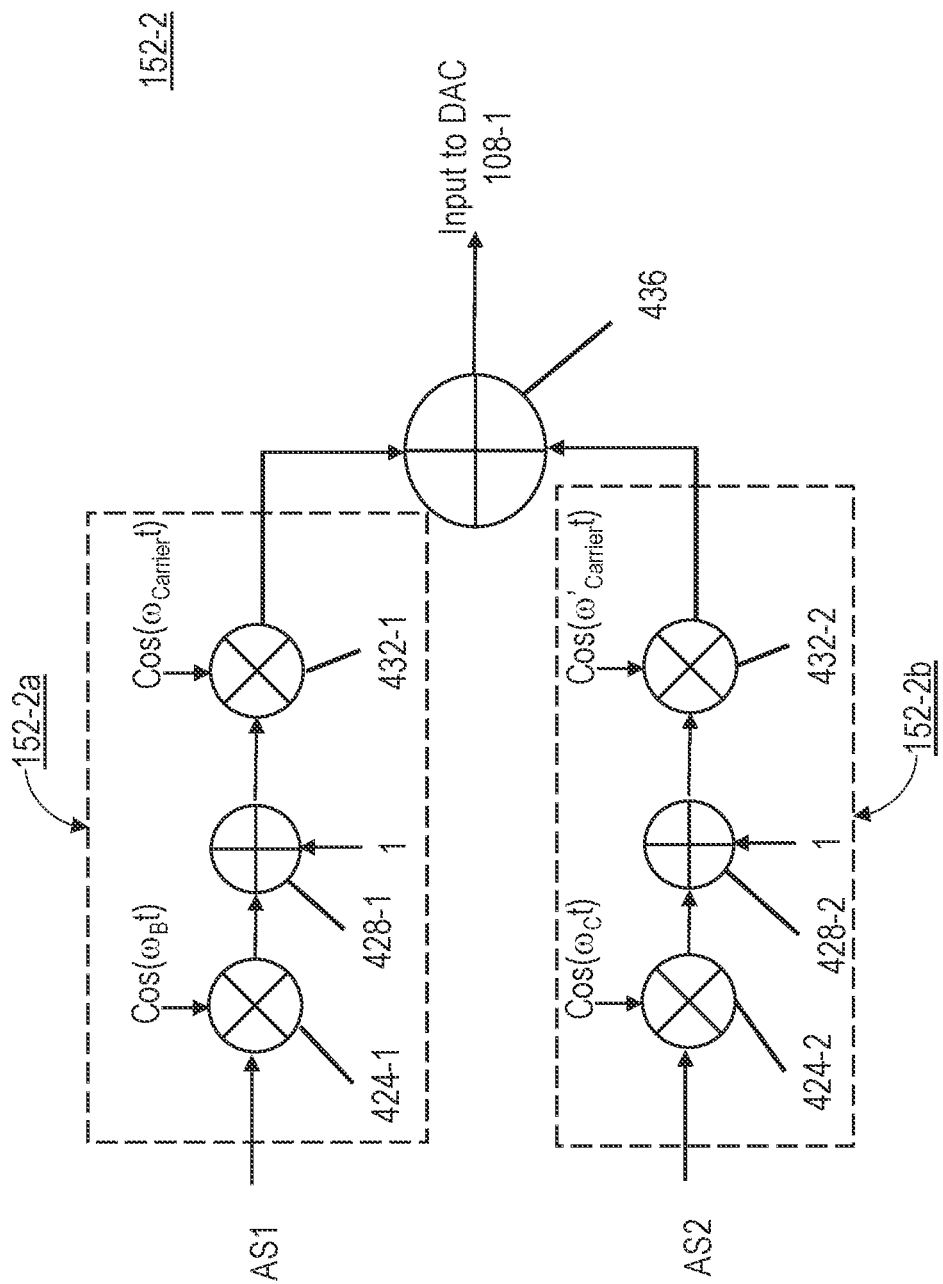
FIG. 10 is a diagram of an alternative embodiment of an AM signal generator constructed in accordance with the present disclosure.

Generation of multiple amplitude modulated tones in the data paths will next be described. As noted above, the AM signal generator 152 can generate and transmit the AM tone super-imposed onto high-speed data supplied from the DSP 100. Referring now to FIG. 10, shown therein is an alternative embodiment of an AM signal generator 152-2 constructed in accordance with the present disclosure. Here, the AM signal generator 152-2 is modified, from the AM signal generator 152-1 shown in FIG. 5, to include a plurality of AM tone generators 152-2a and 152-2b at different frequencies (differing carrier frequencies $\omega_{Carrier}$ and/or differing AM frequencies, $\omega_B$ and $\omega_C$) to carry a first AM signal AS1 and a second AM signal AS2 simultaneously, or nearly simultaneously, as opposed to only one frequency as noted above with respect to FIG. 5. As in the example noted above, the AM signal generator 152-2 provides each of the outputs AMO-1 to AMO-4 to a respective input of the DACs 108-1 to 108-4 (see FIG. 4). These signals are generated in such a way that the DACs 108 output analog signals that include multiple amplitude modulated signals overlaying or super-imposed on the data carrying DAC outputs. Based on the DAC outputs, the MZMDs 116, in turn, output drive signal to the MZMs 120, as noted above. Accordingly, the combined MZM outputs supply optical subcarriers superimposed with multiple amplitude modulated signals at different frequencies based on the outputs of the AM signal generator 152, whereby both the X and Y polarization components are capable of such amplitude modulation.

Returning to FIG. 10, the AM signal generator 152-2 includes a multiplier circuit 424-1 that multiplies first AM signal amplitude AS1 by a cosine function, $\cos(\omega_B t)$, where $\omega_B$ is indicative of a frequency of the amplitude modulation (in rad/s) and t is time as discussed above. In a similar manner as that described above in regard to FIG. 5, the output of the multiplier circuit 424-1 is provided to the adder circuit 428-1 which adds one (1) to product supplied by the multiplier circuit 424-1. The resulting sum output from the adder circuit 428-1 is provided to a multiplier circuit 432-1, which multiplies the resulting sum by a carrier frequency $\omega_{Carrier}$ resulting in a first output.

The AM signal generator 152-2 also includes, for example, a multiplier circuit 424-2 that multiplies the second AM signal amplitude AS2 by a cosine function, $\cos(\omega_C t)$, where $\omega_C$ is indicative of a frequency of another amplitude modulation and t is time as discussed above. Adder circuit 428-2 and the multiplier circuit 432-2 operate in a similar manner as the adder circuit 428-1 and the multiplier circuit 432-1 (except that the multiplier circuit 432-1 multiplies the resulting sum of the adder circuit 428-2 by $\cos(\omega'_{Carrier}t))$ resulting in a second output. As further shown in FIG. 10, the second output of the multiplier circuit 432-2 and the first output of the multiplier circuit 432-1 are provided to an adder circuit 436, which adds the first output and the second output and the resulting sum (AMO-1 in FIG. 4) is combined with a corresponding output from the DSP 100 and input to the DAC 108-1. Accordingly, amplitude modulation at different frequencies, a first amplitude modulation in band $\omega_B$ and a second amplitude modulation in band $\omega_C$, are fed to the DAC 108-1. As a result, both X and Y polarization components of each optical subcarrier are modulated at multiple frequencies to carry the AM tone.

It is understood that additional circuitry similar to the AM signal generator 152-2 shown in FIG. 10 is also included in the AM signal generator 152, in this example, to provide similar signals (AMO-2 to AMO-4) to the inputs of remaining DACs 108-2 to 108-4. As noted above, based on such inputs, the combined output of the MZMs 120 supplies optical subcarriers that are collectively amplitude modulated, such that both the first AM tones and second AM tones are superimposed onto the optical subcarriers to thereby carry first and second AM signals, for example.

Moreover, one or more of the secondary transceivers 34 may include transmitter 82, or transmitter circuitry, similar to the transmitter 70 and may include any of the AM signal generator 152, 152-1, and/or 152-2, as described above.

Figure 11A:
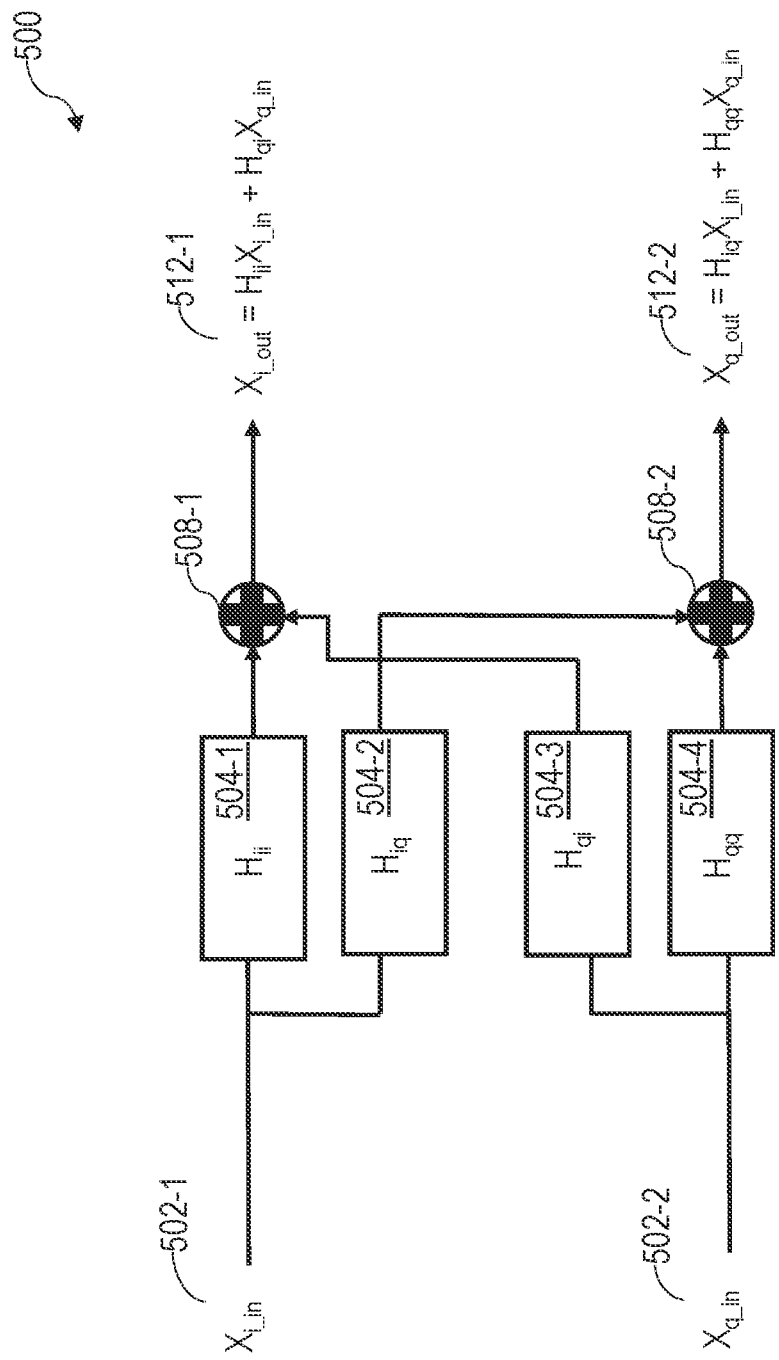
FIG. 11A is an exemplary embodiment of a filter flow diagram constructed in accordance with the present disclosure.

Referring now to FIG. 11A, shown therein is a general schematic of an exemplary embodiment of a filter 500 constructed in accordance with the present disclosure. The filter 500 is an exemplary embodiment of the shape filter circuits 220-1 to 220-8 and/or shape filter circuits 252-1 to 252-8 shown in FIG. 6 and FIG. 7. Generally, the filter 500 receives a first X component 502-1 (Xi) and a second X component 502-2 (Xq). In one embodiment the first X component 502-1 is an XI component and the second X component 502-2 is an XQ component. The first X component 502-1 is then split and filtered by Hii filter 504-1 and Hiq filter 504-2 and the second X component 502-2 is split and filtered by an Hqi filter 504-3 and an Hqq filter 504-4. The Hii filtered signal 504-1 from the first X component 500-1 and the Hqi filtered signal 504-3 of the second X component 502-2 are summed in adder 508-1 resulting in a first X component output 512-1 equal to Hii*Xi+Hqi*Xq. The Hiq filtered signal 504-2 from the first X component 500-1 and the Hqq filtered signal 504-4 of the second X component 502-2 are summed in adder 508-2 resulting in a second X component output 512-2 equal to Hiq*Xi+Hqq*Xq. Note that all signals Xi, Xq and all filters Hii, Hiq, Hqi, Hqq are frequency domain vectors, hence filtering can be denoted as a multiplication.

In some embodiments, because the crosstalk between the first X component 502-1 and the second X component 502-2 is very small, minimal, or non-existent, the Hiq filter values 504-2 and the Hqi filter values 504-3 can be set to "0" resulting in the first X component output 512-1 being equal to Hii*Xi and the second X component output 512-2 being equal to Hqq*Xq.

The filter 500 shown in FIG. 11A is directed to a single polarization, i.e., the X component; however, it is understood that similar circuitry as that shown in FIG. 11A may be employed to determine the Y component as well.

Figure 11B:
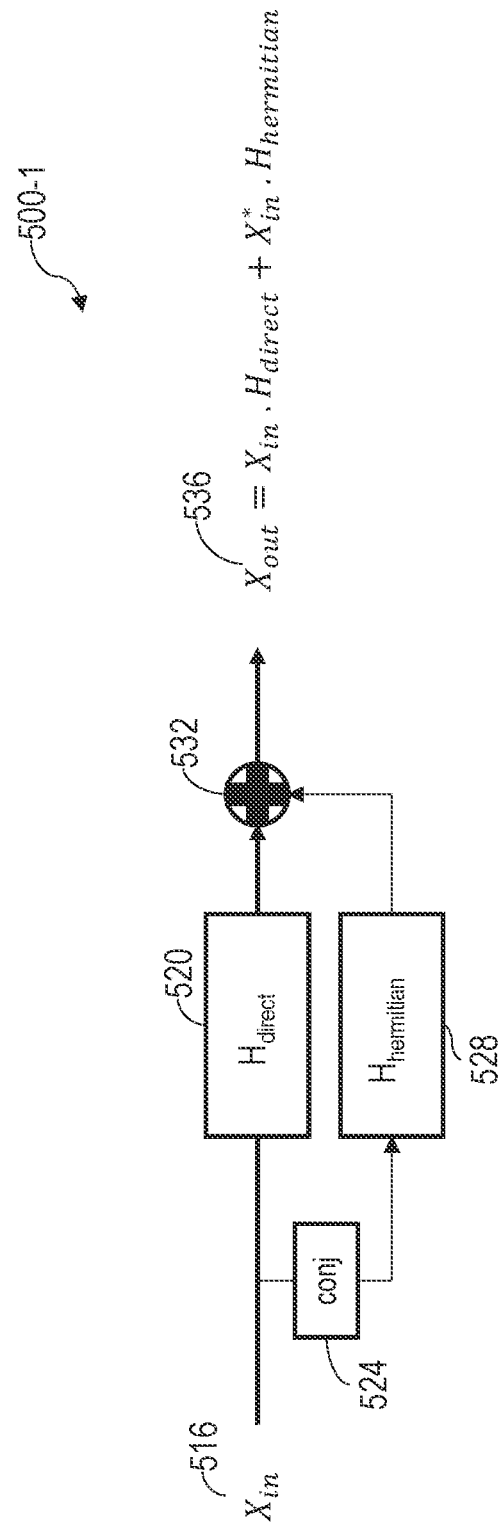
FIG. 11B is an exemplary embodiment of a filter flow diagram constructed in accordance with the present disclosure.

Referring now to FIG. 11B, shown therein is a block diagram of an exemplary embodiment of a filter 500-1 constructed in accordance with the present disclosure. The filter 500-1 is an alternative embodiment of the filter 500 described above in reference to FIG. 11A. The filter 500-1 is shown as receiving an input 516 of $X_{in}$ where X is a complex denotation of an $X_I$ and $X_Q$ stream data where $X_{in}=X_{i\_in}+jX_{q\_in}$ and $X_{out}=X_{i\_out}+jX_{q\_out}$. The input 516 is split between two paths, where on the first path, the input 516 is filtered by a complex-valued $H_{direct}$ filter 520 and on the second path, the input 516 passes through a conjugation block 524, where the conjugation block 524 negates imaginary components of the input 516, and a complex-valued $H_{hermitian}$ filter 528. The input 516 after passing through the first path and the input 516 after passing through the second path are combined by an adder 532 resulting in an output 536 of $X_{out}$. The output 536, therefore, can be represented by the equation $X_{out}=X_{in} \cdot H_{direct}+X^*_{in} \cdot H_{hermitian}$. It should be noted that the conjugation block 524 may be denoted in the equation for $X_{out}$ as an asterisk (*), such that if the conjugation block 524 receives an input of X=XI+jXQ, then the conjugation block 524 may have an output of X*=XI−jXQ.

Figure 12:
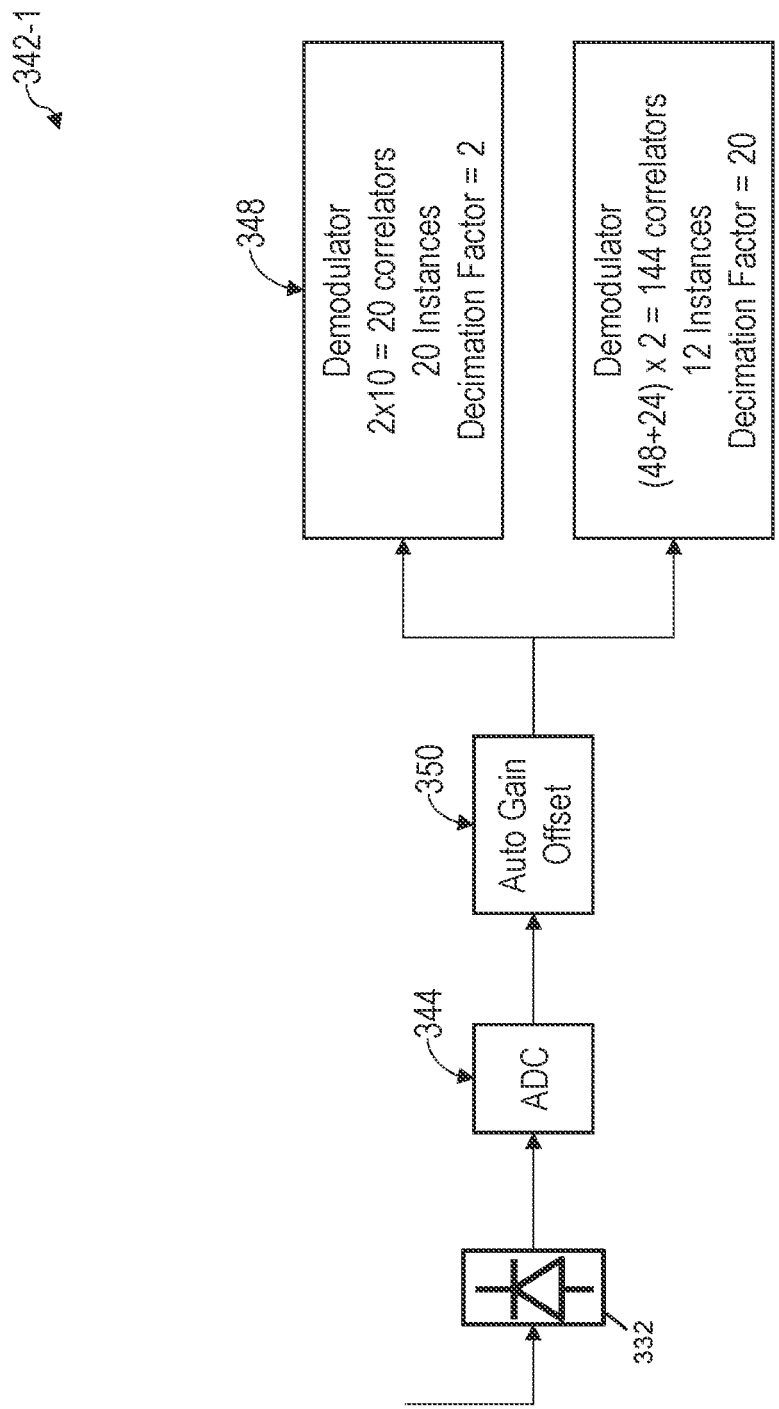
FIG. 12 is a flow diagram of an exemplary embodiment of a demodulation circuitry constructed in accordance with the present disclosure.

Referring now to FIG. 12, shown therein is a flow diagram of an exemplary embodiment of a demodulation circuitry 342-1 constructed in accordance with the present disclosure. The demodulation circuitry 342-1 is similar in function to the demodulation circuitry 342 shown in FIG. 8 and is a particular embodiment of the demodulation circuitry 342. As shown above in FIG. 8, a portion of the optical signal is measured by the photodetector 332, creating an analog signal (e.g., voltage or current) that is then received by the ADC 344. The analog signal is amplified and sampled by the ADC 344 resulting in a digital signal that first passes through an auto gain offset module 350 before passing to the demodulator 348. The demodulator 348 may include one or more correlator to demodulate the digital signal. In one embodiment, the demodulator 348 and/or the one or more correlator is implemented in an FPGA or an ASIC, whereas in other embodiments, another processor is used such as the microprocessor 300 or the DSP 100, for example. In one embodiment, each correlator has about 30 MHz bandwidth. In another embodiment, a particular correlator of the one or more correlator is used for all measurements, e.g., for consistency to reduce differences between each correlator.

In one embodiment, the photodetector 332 may be implemented as a simple photodiode with narrow bandwidth, e.g., a bandwidth of about 100 KHz to 100 MHz, or some range there-between.

Figure 13:
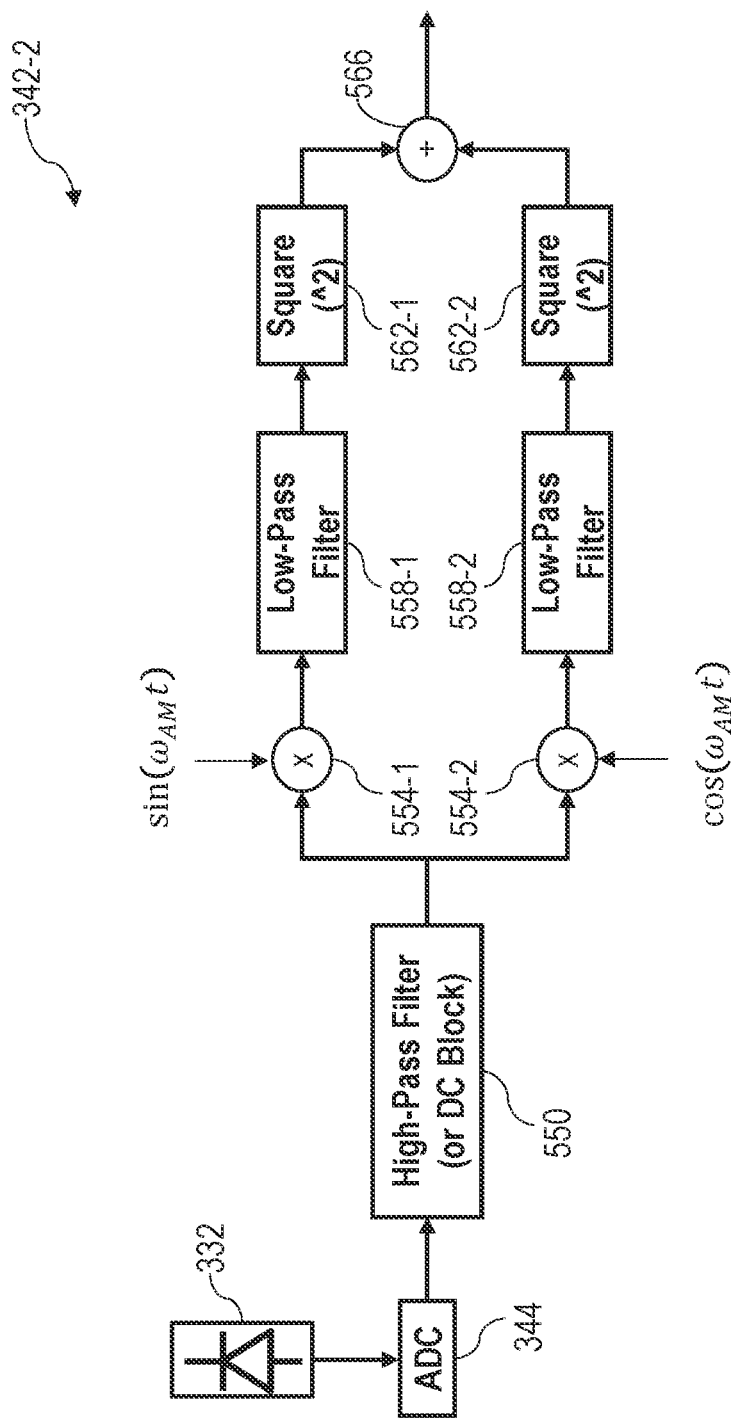
FIG. 13 is a flow diagram of an exemplary embodiment of a demodulation circuitry constructed in accordance with the present disclosure.

Referring now to FIG. 13, shown therein is a flow diagram of an exemplary embodiment of a demodulation circuitry 342-2 constructed in accordance with the present disclosure. In one embodiment, the demodulation circuitry 342-2 is implemented in an FPGA or an ASIC processor and is a photodetector current demodulator. The demodulation circuitry 342 correlates to a desired frequency and extracts the power at that frequency. As shown above in FIG. 8, a portion of the optical signal is measured by the photodetector 332, creating an analog signal (e.g., voltage or current) that is then received by the ADC 344. The analog signal is amplified and sampled by the ADC 344 resulting in a digital signal that is processed by a filter component 550 such as a high-pass filter or a DC Block. Once the digital signal is processed by the filter component 550 the signal is split onto two paths.

On the first path, the digital signal is multiplied by $\sin(\omega_{AM}t)$ by multiplier 554-1. The sine-multiplied signal, then passes through a low-pass filter 558-1, is amplified by amplifier 562-1 and enters a summation block 566. On the second path, the digital signal is multiplied by $\cos(\omega_{AM}t)$ by multiplier 554-2. The cosine-multiplied signal, then passes through a low-pass filter 558-2, is amplified by amplifier 562-2 and enters the summation block 566. At the summation block 566, the sine-multiplied signal and the cosine-multiplied signal are combined into a tone amplitude response at frequency $\omega_{AM}$.

In one embodiment, the AM tone is the same as the one generated by the AM signal generator 152. In one embodiment, the low-pass filter 558-1 and/or the low-pass filter 558-2 is a low bandwidth filter. In one embodiment, the photodetector 332 is a low bandwidth photodetector that detects a power of the AM tone but is insensitive to frequencies of the optical signal at which data is being transmitted. It is important that the bandwidth of the photodetector 332 and the demodulation circuitry 342 are above the frequency of the AM tone ($\omega_{AM}$). Note that the bandwidth of the photodetector 332 and the demodulation circuitry 342 may be less than the bandwidth of the optical signal carrying data. In this manner, the AM tone is not affected, or is minimally affected, by the data transmitted on the optical signal, and, similarly, the data transmitted on the optical signal is not affected, or is minimally affected, by the AM tone.

Referring now to FIG. 14, shown therein is a process flow diagram of an exemplary embodiment of a frequency response determination process 600 in accordance with the present disclosure. The frequency response determination process 600 generally includes the steps of: setting up the AM signal generator (step 604); sweeping the carrier frequency of the AM tone across the band of interest (step 608); measuring the power at a tone detector at multiple instants of time during the sweep (step 612); obtaining the amplitude response at each instant of time (step 616); calculating the phase response (step 620); determining the frequency response (step 624); calculating pre-compensation filter parameters (step 628); and implementing the pre-compensation filter parameters (step 632). In some embodiments, the frequency response determination process 600 is performed for one or more channel or subcarrier in the optical signal. In one embodiment, the frequency response determination process is performed for each data path (XI/TEI, XQ/TEQ, YI/TMI, YQ/TMQ).

In one embodiment, setting up the AM signal generator (step 604) includes, for each channel or subcarrier, for each polarization X and Y and for each path I and Q, setting up the AM signal generator 152 with an AM signal resulting in an AM tone having a known carrier frequency and a known AM frequency. In one embodiment, the AM tone has a component at the carrier frequency, a component at the carrier frequency less the AM frequency, and a component at the carrier frequency plus the AM frequency, as described in more detail below with respect to FIG. 15.

In one embodiment, sweeping the AM tone across the band of interest (step 608) includes causing the AM signal generator 152 to transmit a plurality of AM tones 658 across a band of interest, such as a subcarrier or an optical signal. In one embodiment, sweeping the AM tone across the band of interest (step 608) includes sweeping the AM tone across only a portion of the band of interest. In one embodiment, sweeping the AM tone's carrier frequency across the band of interest (step 608) includes sweeping the AM tone's carrier frequency ($\omega$carrier) from a frequency of about 0.5 GHz to a frequency of about 50 GHz with steps of about 0.1 GHz. In other words, the AM tone is first centered on a 0.5 GHz carrier frequency, then centered on a 0.6 GHz frequency, then centered on a 0.7 GHz frequency, etc., until, lastly, the AM tone is centered on a 50 GHz carrier frequency. In one embodiment, the AM tone is centered on each frequency in order from lowest frequency to highest frequency, the AM tone is centered on each frequency in order from highest frequency to lowest frequency, or the AM tone is centered on one or more test frequency between the lowest frequency and the highest frequency, inclusive, where the test frequency is the lowest frequency plus a multiplier of the step frequency in any order not ascending or descending.

In one embodiment, the tone detector is a photodetector, such as the photodetector 332, a SOA in reverse bias, or any other device operable to detect and/or measure a power of the optical signal. In one embodiment, measuring the power at the tone detector (step 612) includes measuring an output of the photodetector 332, such as by the ADC 344 of the demodulation circuitry 342, which corresponds to the square of the amplitude response of the transmitter path. In one embodiment, measuring the power at the tone detector (step 612) is performed while the AM tone 658 is being swept across the band of interest. For example, as shown in FIG. 15 below, measuring the power at the tone detector (step 612) may include measuring the power of the photodetector 332 for a first period of time when the AM tone 658-1 is supplied, e.g., to the DAC 108 and measuring the power of the photodetector 332 for a second period of time when the AM tone 658-2 is supplied, e.g., to the DAC 108.

In one embodiment, measuring the power at the tone detector (step 612) includes measuring the power of the photodetector 332 multiple times and calculating an average of the measured power. In one embodiment, measuring the power at the tone detector (step 612) further includes determining a measured power of the photodetector 332 by passing the voltage of the photodetector through the ADC 344. In one embodiment, measuring the power at the tone detector (step 612) is performed by an FPGA, ASIC, or microprocessor 300, the DSP 100, or the like, implementing the ADC 344.

In one embodiment, obtaining the amplitude response (step 616) includes interpolating and normalizing the measured power at the tone demodulator from step 612. Obtaining the amplitude response (step 616) may be performed by the demodulation circuitry 342. As discussed above, the measured power may be analyzed by the demodulation circuitry 342, e.g., the demodulation circuitry 342-2, to determine the amplitude response. The amplitude response is the square root of the measured tone strength as the AM tone is swept across the band.

In one embodiment, calculating the phase response (step 620) includes calculating the phase response using Kramers-Kronig relation:

$$\text{Re}\{H(\omega)\} = \frac{2}{\omega} * \text{Im}\{H(\omega)\} = \int_{-\infty}^{\infty} \frac{2}{\omega - \omega'} \text{Im}\{H(\omega')\} d\omega'.$$

If the transmitter 70 has an impulse response that is well-behaved and matches Kramers-Kronig conditions, the phase response can be calculated from the amplitude response. The Kramers-Kronig conditions that should be matched include that h(t) is (1) a real value, (2) is causal, and (3) is analytic. If the conditions are matched, the following equation is true:

$$\text{Re}\{H(\omega)\} = \frac{2}{\omega} * \text{Im}\{H(\omega)\} = \int_{-\infty}^{\infty} \frac{2}{\omega - \omega'} \text{Im}\{H(\omega')\} d\omega'.$$

Further simplifications results in the equation $$\angle H(\omega) = -\frac{\pi}{2} \frac{1}{2\pi} \int_{-\infty}^{\infty} \frac{d(M(\omega, v))}{dv} f(v) dv \text{ where } M(\omega, v) =$$

-continued $$\ln(|H(\omega e^v)|) \text{ and } f(v) = \frac{2}{\pi^2}\ln\left(\coth\left(\frac{|v|}{2}\right)\right).$$

With an additional condition that h(t) is a minimum phase, e.g., mod 2π, the above equation can be simplified to $$\angle H(\omega) = -hilbert\{\ln(|H(\omega)|)\} \qquad \text{(equation 1)}$$

$$\text{where } hilbert\{x(t)\} = \frac{1}{\pi}\int_\infty^{-\infty}\frac{x(\tau)}{t-\tau}d\tau.$$

By using Equation 1, the phase response can be calculated for the amplitude response for each path I, Q, of each component X, Y as shown in FIGS. 18A-D. In one embodiment, calculating the phase response (step 620) is performed by an FPGA, ASIC, microprocessor 300, the DSP 100, the central software 38, or the like.

In one embodiment, determining the frequency response (step 624) includes combining the amplitude response and the phase response into the frequency response. In some embodiments, this is performed by the DSP 100, the microprocessor 300, e.g., within the demodulation circuitry 342, within an FPGA, within an ASIC, the central software 38, or the like. In one embodiment, determining the frequency response (step 624) includes averaging the amplitude response, the phase response, and/or the frequency response over multiple sweeps of the AM tone across the bands of interest.

In some embodiments, determining the frequency response (step 624) is performed without first calculating the phase response. In these embodiments, the frequency response includes only the amplitude response and not the phase response.

In one embodiment, determining the frequency response (step 624) includes combining the amplitude response with the phase response for each path I, Q, of each component X, Y to determine a frequency response for each channel of the optical signal. In one embodiment, determining the frequency response (step 624) includes combining the amplitude response with the phase response for each path I, Q, of each component X, Y for each channel to determine a frequency response of the optical signal.

In one embodiment, calculating pre-compensation filter parameters (step 628) includes taking an inverse of the frequency response determined in step 624. In one embodiment, calculating pre-compensation filter parameters (step 628) includes taking an inverse of the amplitude response for each path I, Q, of each component X, Y, as shown in FIGS. 17A-D below.

In one embodiment, calculating pre-compensation filter parameters (step 628) includes taking an inverse of the frequency response for each path I, Q, of each component X, Y, as shown in FIGS. 17A-D below. In one embodiment, calculating pre-compensation filter parameters (step 628) is performed by an FPGA, ASIC, the DSP 100, the microprocessor 300, the central software 38, or the like.

In one embodiment, implementing the pre-compensation filter parameters (step 632) includes applying one or more of the pre-compensation filter parameters for the frequency response on one or more of the shape filter circuits 220-1 to 220-8 or 252-1 to 252-8. The pre-compensation filter parameters may include an amplitude and/or phase filter to be performed on the optical signal at a particular frequency or on a particular range of frequencies. The amplitude filtering may correspond to the amplitude, in dB, of the inverse of the frequency response as shown in FIGS. 17A-D. In one embodiment, implementing the pre-compensation filter parameters (step 632) is performed by the DSP 100, the shape filter circuits 220-1 to 220-8, 252-1 to 252-8, a CD filter, an FDEQ, or any other frequency domain filter or amplifier in the transmitter 70 able to affect the amplitude and/or phase of the optical signal.

In one embodiment, implementing the pre-compensation filter parameters (step 632) includes applying one or more of the pre-compensation filter parameters for the frequency response against the optical signal. In embodiments where the optical signal does not include multiple subcarriers, implementing the pre-compensation filter parameters (step 632) includes applying one or more of the pre-compensation filter parameters for the frequency response on the bandwidth of the optical signal on which data is being transmitted. For example, if data is being transmitted on an optical signal from a first frequency to a second frequency, implementing the pre-compensation filter parameters may include applying the pre-compensation parameters on the optical signal from the first frequency to the second frequency, e.g., by using a frequency domain equalizer or a CD filter.

In one embodiment, implementing the pre-compensation filter parameters (step 632) includes storing the pre-compensation filter parameters in a memory associated with the DSP 100 or otherwise associated with the primary node 14. In one embodiment, the pre-compensation filter parameters are stored in the memory component 224 or 256. In another embodiment, the pre-compensation filter parameters are stored in the central software 38.

In one embodiment, the frequency response determination process 600 is performed while the primary node 14, the primary transceiver 22, and/or the transmitter 70 is in operation, that is, while the primary node 14, the primary transceiver 22, and/or the transmitter 70 is transmitting data to the secondary node 18. In other embodiments, one or more of the steps 604-632 of the frequency response determination process 600 is performed while the primary node 14, the primary transceiver 22, and/or the transmitter 70 is in use or operation, is in a maintenance window, is being manufactured, and/or when the frequency response determination process 600 is triggered, or some combination thereof.

In one embodiment, the frequency response determination process 600 is triggered by the central software 38, by a user in communication with the primary node 14 or some component of the primary node 14 such as the primary transceiver 22 or the transmitter 70, after a predetermined period of time has elapsed since the frequency response determination process 600 was previously executed, when a temperature of one or more of the primary node 14, the primary transceiver 22, and/or the transmitter 70 exceeds a predetermined temperature threshold, when a temperature of one or more of the primary node 14, the primary transceiver 22, and/or the transmitter 70 exceeds a predetermined temperature threshold for a specified period of time, when one or more of the primary node 14, the primary transceiver 22, and/or the transmitter 70 has been in service for a specified period of time, e.g., since the primary node 14, the primary transceiver 22, and/or the transmitter 70 was installed in the optical communication system 10, when one or more of the primary node 14, the primary transceiver 22, and/or the transmitter 70 has transmitted a quantity of data beyond a data transfer threshold, or some combination thereof, or the like.

Figure 15:
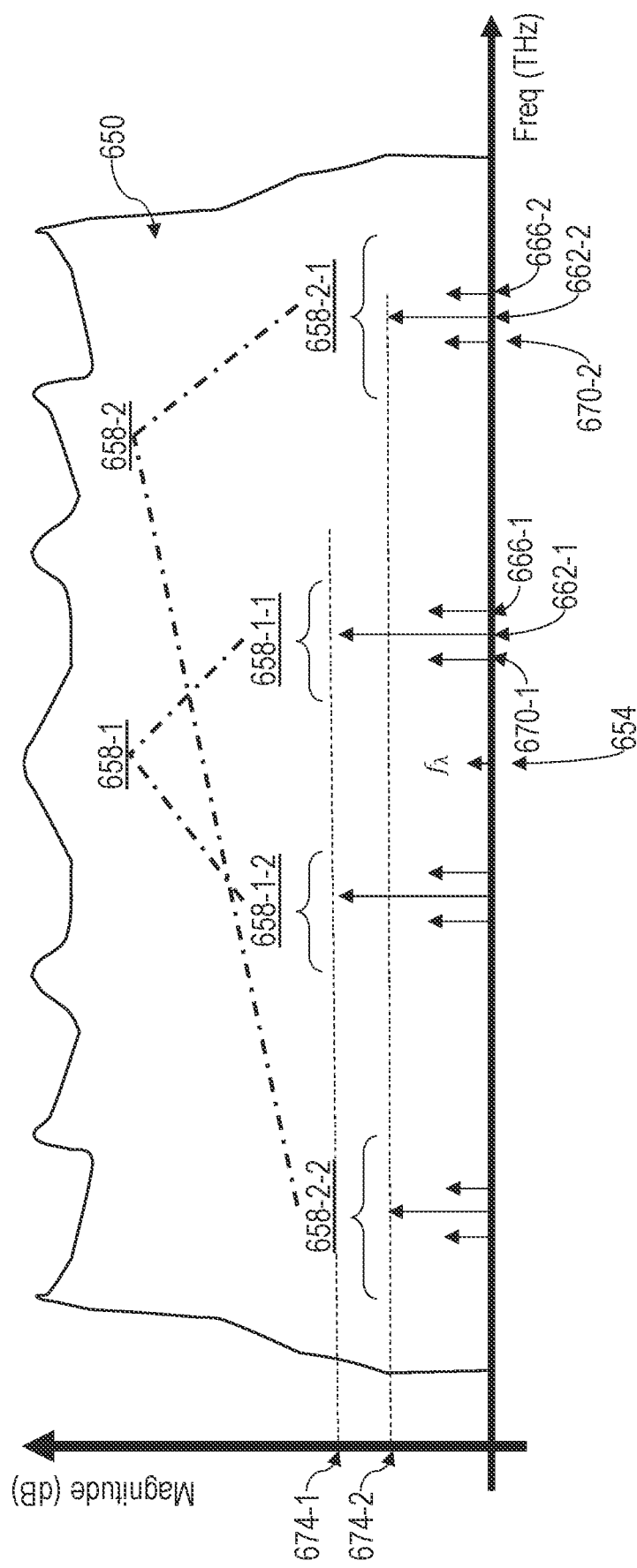
FIG. 15 is a graph of an exemplary embodiment of the frequency response of a transmitter over a band of interest; also showing the AM-modulated tone whose carrier frequency is being swept across the band of interest.

Referring now to FIG. 15, shown therein is a graph of an exemplary embodiment of a band of interest 650 and an AM tone in the optical domain. As shown, the band of interest 650 is centered around an optical frequency 654 of $f_\lambda$. Also shown is an AM tone 658-1-1 and an AM tone 658-2-1. Both the AM tone 658-1-1 and the AM tone 658-2-1 are amplitude modulated tones centered at $f_\lambda$ and offset from $f_\lambda$ by a carrier frequency 662 (carrier frequency 662-1 and carrier frequency 662-2, respectively). For example, the AM tone 658-1-1 is offset from $f_\lambda$ by the carrier frequency 662-1 of $nf_c$, thereby centering the AM tone 658-1-1 at $f_\lambda+nf_c$ and a conjugate tone 658-1-2 at $f_\lambda-nf_c$. The AM tone 658-1-1 is further comprised of a first component 666-1 offset from the AM tone center by $+f_{AM}$, and is thereby located at $f_\lambda+nf_c+f_{AM}$ and a second component 670-1 offset from the AM tone center by $-f_{AM}$, thereby located at $f_\lambda+nf_c-f_{AM}$. The conjugate tone 658-1-2, being a replica of the AM tone 658-1-1, is similarly constructed wherein the conjugate tone 658-1-2 comprises a first component offset from the AM tone center by $+f_{AM}$, and is thereby located at $f_\lambda-nf_c+f_{AM}$ and a second component offset from the AM tone center by $-f_{AM}$, thereby located at $f_\lambda-nf_c-f_{AM}$.

Similarly, the AM tone 658-2-1 is offset from $f_\lambda$ by the carrier frequency 662-2 of $+mf_c$, thereby centering the AM tone 658-2-1 at $f_\lambda+mf_c$ and a conjugate 658-2-2 at $f_\lambda-mf_c$. The AM tone 658-2-1 is further comprised of a first component 666-2 offset from the AM tone center by $+f_{AM}$, thereby located at $f_\lambda+mf_c+f_{AM}$ and a second component 670-2 offset from the AM tone center by $-f_{AM}$, thereby located at $f_\lambda+mf_c-f_{AM}$. The conjugate tone 658-2-2, being a replica of the AM tone 658-2-1, is similarly constructed wherein the conjugate tone 658-2-2 comprises a first component offset from the AM tone center by $+f_{AM}$, and is thereby located at $f_\lambda-mf_c+f_{AM}$ and a second component offset from the AM tone center by $-f_{AM}$, thereby located at $f_\lambda-mf_c-f_{AM}$.

In one embodiment, the AM tone 658-1 and 658-2, after passing through various optical component, thereby experiencing different transmitter impairments, includes an amplitude response 674, i.e., amplitude response 674-1 and amplitude response 674-2, respectively. Note that due to the nature of MZM modulation, the AM tone 658-1-1 and 658-2-1, as well as conjugate tone 658-1-2 and 658-2-2, will be sampled simultaneously.

In one embodiment, the AM tone 658-1 is an AM tone transmitted at a first period of time and the AM tone 658-2 is an AM tone transmitted at a second period of time where the first period of time and the second period of time are different. In one embodiment, additional carrier frequencies 662 may be centered at a frequency offset by a multiple (n or m) of $\pm f_c$, e.g., $\pm 2f_c$, $\pm 3f_c$, $\pm 4f_c$, etc.

In one embodiment, the carrier frequency 662 may have a step size, i.e., $f_c$, of 100 MHz. In other embodiments, the carrier frequency 662 may have a step size $f_c$ of between about 10 MHz and about 10 GHz. The carrier frequency 662 step size, $f_c$, may be selected based on a desired amplitude response, or frequency response, resolution where a smaller step size, $f_c$, results in a higher resolution and a larger step size, $f_c$, results in a lower resolution.

In one embodiment, the carrier frequency 662 may have a frequency range, that is, has a maximum frequency offset of $mf_c$ and a minimum frequency offset of $nf_c$. In one embodiment, the frequency range is 18 GHz, whereas in other embodiments the frequency range is a range selected from within a frequency of about 0.5 GHz to about 100 GHz. It is conceivable that the frequency range has an upper bound greater than 100 GHz and that the upper bound is limited by capabilities of the transmitter 70 such that the frequency range is selected from a range based on the frequencies the transmitter 70 is capable of processing. In one embodiment, the frequency range is the bandwidth of an optical signal, or the bandwidth of an optical subcarrier.

In one embodiment, the AM signal generator 152 may supply the AM tone 658-1 at the first period of time and the AM tone 658-2 at the second period of time. The AM signal generator 152 may then change a multiplier (n, m) and supply the AM tone 658 centered at a different frequency with the frequency range. The AM signal generator 152 adjusting the step multiplier (n, m) resulting in multiple AM tones 658 within the frequency range may be referred to as frequency sweeping, e.g., sweeping the AM tone 658 across the band of interest.

Figure 16A:
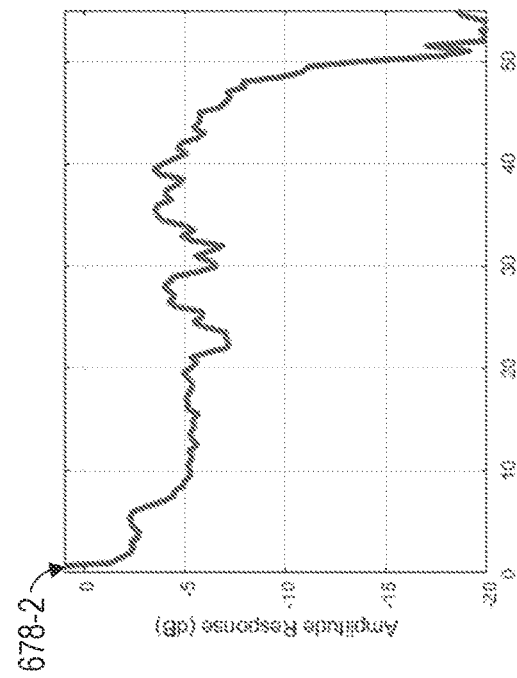
FIGS. 16A-D are graphs of exemplary embodiments of measurements of the amplitude response measured for each of paths TEI, TEQ, TMI, and TMQ.
Figure 16B:
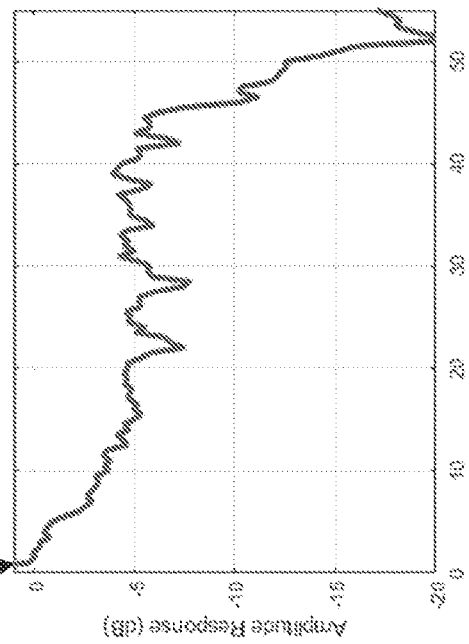
Figure 16C:
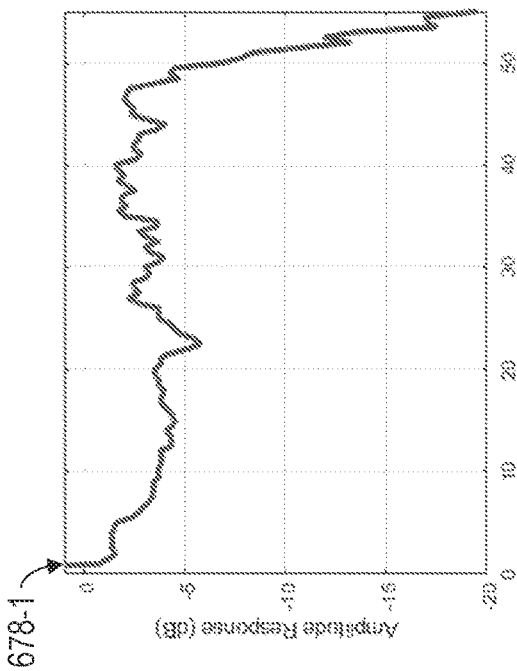
Figure 16D:
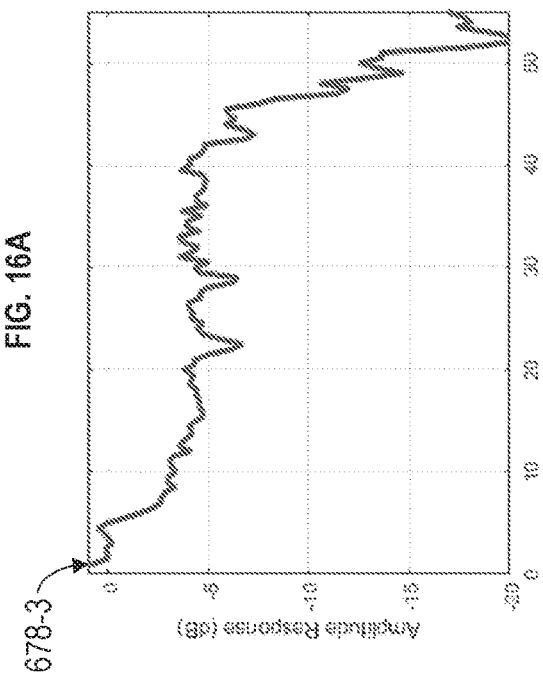

Referring now to FIGS. 16A-D, shown there are graphs of exemplary embodiments of real-world measurements of the amplitude response measured by the ADC 344 and analyzed by the demodulation circuitry 342. Shown in FIG. 16A is an TEI amplitude response 678-1, shown in FIG. 16B is an TEQ amplitude response 678-2, shown in FIG. 16C is a TMI amplitude response 678-3, and shown in FIG. 16D is a TMQ amplitude response 678-4. As shown in FIGS. 16A-D, the frequency step is 0.5 GHz with a frequency range of about 0 GHz to about 60 GHz.

Referring now to FIG. 17A-D, shown therein are graphs of exemplary embodiments of an amplitude response calibration 686 based on the amplitude response 678 of FIGS. 16A-D, respectively. Shown in FIG. 17A is a TEI amplitude response calibration 686-1 based on an inverse of the TEI amplitude response 678-1 of FIG. 16A, shown in FIG. 17B is a TEQ amplitude response calibration 686-2 based on an inverse of the TEQ amplitude response 678-2 of FIG. 16B, shown in FIG. 17C is a TMI amplitude response calibration 686-3 based on an inverse of the TMI amplitude response 678-3 of FIG. 16C, and shown in FIG. 17D is a TMQ amplitude response calibration 686-4 based on an inverse of the TMQ amplitude response 678-4 of FIG. 16D.

In one embodiment, when the amplitude response calibration 686 is not associated with a phase response, the amplitude response calibration 686 for any of TEI, TMI, TEQ or TMQ shown in FIGS. 17A-D may be used in the shape filter circuits 220-1 to 220-8 or 252-1 to 252-8 as pre-compensation for only the amplitude responses.

In some embodiments, when the amplitude response calibration 686 has a bandwidth greater than the amplitude responses 678, for any frequency outside the frequency range of the amplitude responses 678, the amplitude response calibration 686 will include a frequency cutoff where the amplitude response calibration is set to zero (0).

In one embodiment, the amplitude response calibration for each of the TEI amplitude response calibration 686-1, the TEQ amplitude response calibration 686-2, the TMI amplitude response calibration 686-3, and the TMQ amplitude response calibration 686-4 also includes a maximum filter attenuation, as set in the demodulation circuitry 342. The maximum filter attenuation may be a power, in dB, set as a limit for the amplitude response calibration. For example, the maximum filter attenuation may be set to about 8 dB. In one embodiment, the maximum filter attenuation may be set to a power in the range of about 1 dB to about 40 dB. As shown in FIG. 17, the maximum filter attenuation is set to 20 dB. In some embodiments, the maximum filter attenuation may be in a range from about 20 dB to 40 dB. In one embodiment, the maximum filter attenuation may be dependent on compensation capability of the shaping filters 220-1 to 220-8 and the shaping filters 252-1 to 252-8.

In some embodiments, the amplitude response calibration 686 for each of TEI, TMI, TEQ, and TMQ is a frequency response calibration when the amplitude response calibration 686 is combined with a phase response for each of the TEI, TMI, TEQ, and TMQ optical signals. The frequency response calibration may be referred to as a full frequency response calibration when the amplitude response calibration 686 is combined with the phase response for each of the TEI, TMI, TEQ and TMQ optical signals.

Referring now to FIGS. 18A-D, shown therein are graphs of an exemplary embodiment of the retrieved phase response (unwrapped and in radians) derived from each of the measured TEI amplitude response 678-1, TEQ amplitude response 678-2, TMI amplitude response 678-3, and TMQ amplitude response 678-4, respectively. The phase response for each of TEI 720-1, TEQ 720-2, TMI 720-3, and TMQ 720-4 is calculated by applying the equations $$\angle H(\omega) = -hilbert\{\ln(|H(\omega)|)\} \text{ where } hilbert\{x(t)\} = \frac{1}{\pi}\int_{\infty}^{-\infty}\frac{x(\tau)}{t-\tau}d\tau$$

to the TEI amplitude response 678-1, TEQ amplitude response 678-2, TMI amplitude response 678-3, and TMQ amplitude response 678-4, respectively.

Figure 19A:
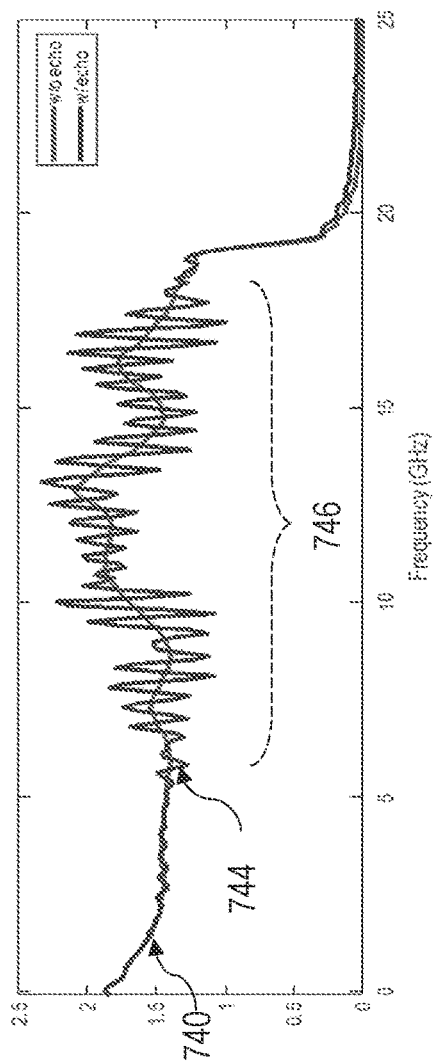
FIG. 19A is a graph of an exemplary embodiment of an amplitude response with and without an echo causing a phase response.
Figure 19B:
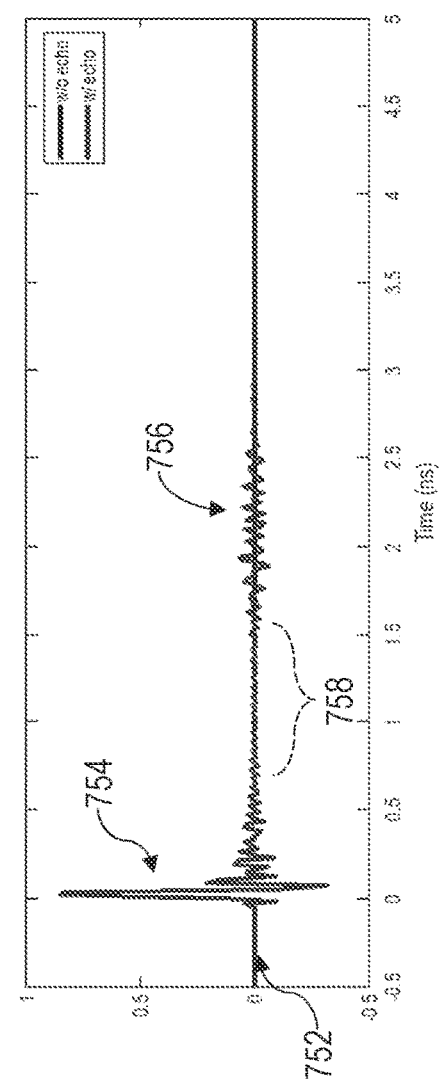
FIG. 19B is a graph of an exemplary embodiment of time-domain waveforms of FIG. 19A.

Referring now to FIG. 19A, in conjunction with FIG. 19B, shown therein is a graph an exemplary embodiment of one transmitter path, e.g., one of TEI, TMI, TEQ, and TMQ having an amplitude response 740, and having a simulated frequency-dependent echo response 744 on top of the amplitude response 740. The frequency-dependent echo response 744 may be caused by the nature of various optical components of the transmitter 70, for example, and may, for example, be from impedance mismatch of the electronic cabling, etc., as previously discussed.

The frequency-dependent echo response 744 results in a phase response, which in turn creates ringing 746 vs frequency in the amplitude plot of FIG. 19A. It should be noted that the ringing 746, as identified in FIG. 19A, only identifies larger-amplitude ringing in a range of about 5 GHz to about 18 GHz as an example; however, the ringing 746 may extend throughout the frequency range of the amplitude response 740 at greater or lesser amplitudes than the amplitude of the ringing 746 in the range identified.

The phase response can be calculated by plugging the amplitude response into Equation 1, and the result, in the time domain, is shown in FIG. 19B overlaid on the original waveform in the time domain to show that Equation 1 can be used to retrieve the phase response. As shown in FIG. 19B, a retrieved time-domain response 752 has a short-delay main component 754, e.g., due to the amplitude impairments of the path (one of TEI, TMI, TEQ, and TMQ), and a smaller echo component 756 at some offset delay 758 due to the phase response.

Figure 20A:
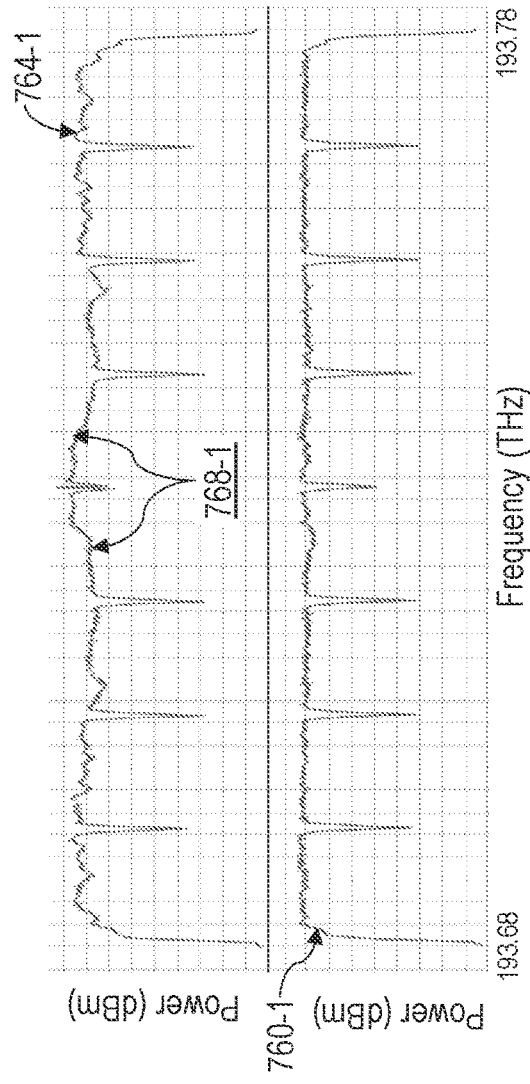
FIGS. 20A-D are graphs of exemplary embodiments of each path I, Q of each component X, Y of a calibrated vs uncalibrated optical signal of one channel.
Figure 20B:
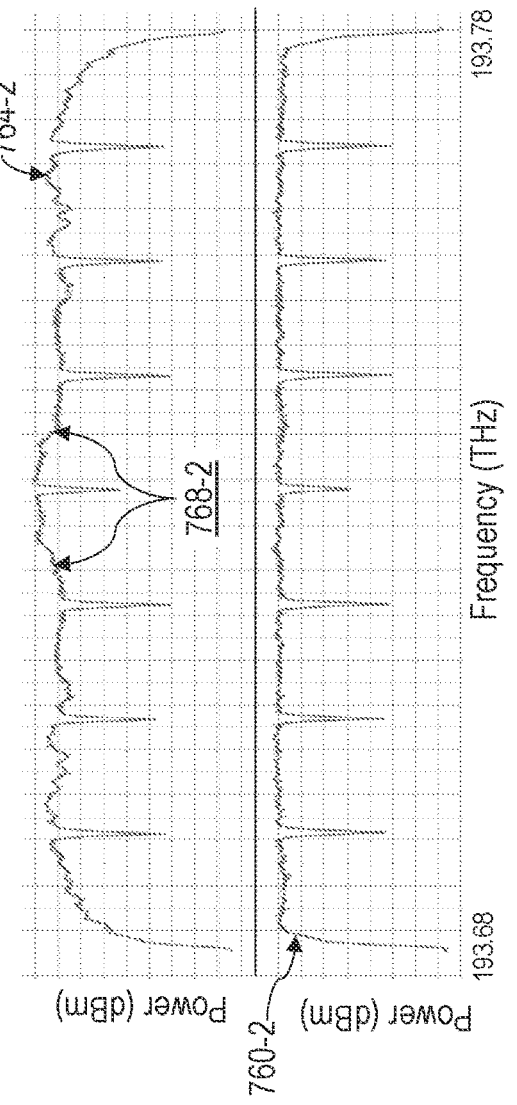
Figure 20C:
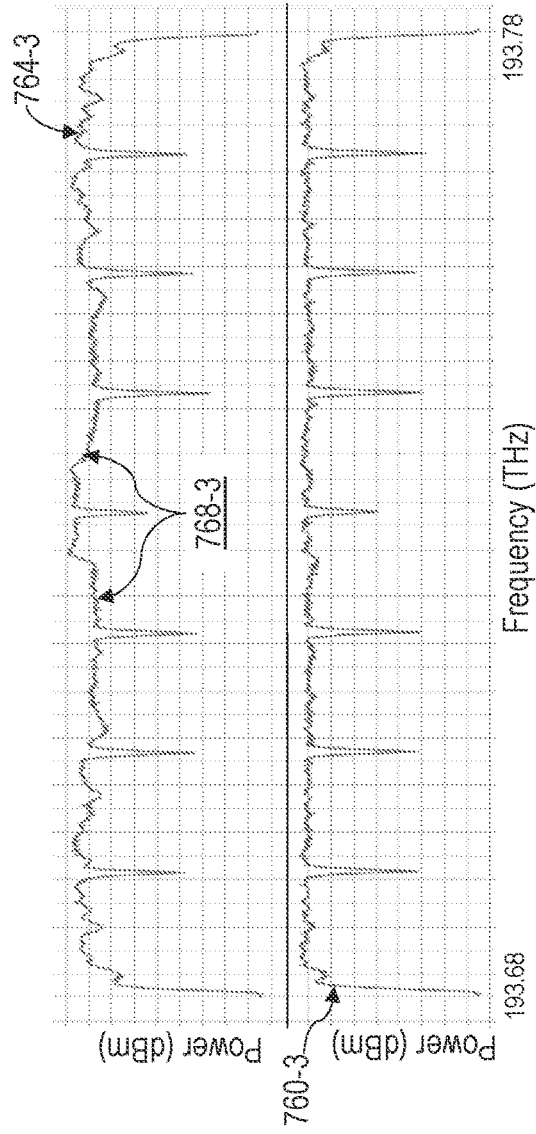
Figure 20D:
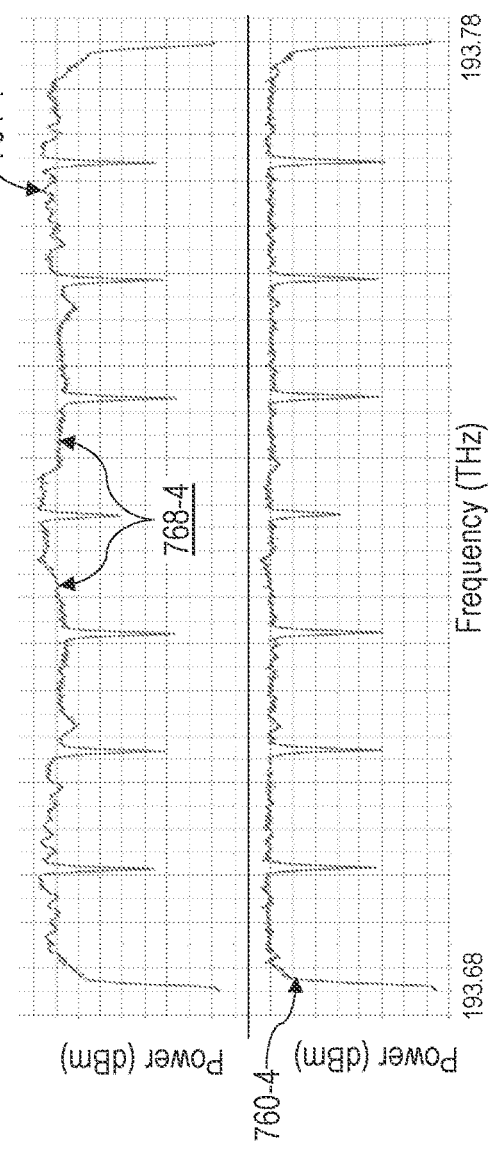

Referring now to FIGS. 20A-D, shown therein are graphs of exemplary embodiments of each path I, Q of each polarization X, Y of a calibrated optical signal 760 of the optical signal 764 having eight subcarriers 768 of a single channel. Shown in FIG. 20A is a TEI calibrated optical signal 760-1 comprising eight subcarriers 768-1 compared to optical signal 764-1 without calibration. Shown in FIG. 20B is a TEQ calibrated optical signal 760-2 comprising eight subcarriers 768-2 compared to optical signal 764-2 without calibration. Shown in FIG. 20C is a TMI calibrated optical signal 760-3 comprising eight subcarriers 768-3 compared to optical signal 764-3 without calibration. Shown in FIG. 20D is a TMQ calibrated optical signal 760-4 comprising eight subcarriers 768-4 compared to optical signal 764-4 without calibration.

Figure 21A:
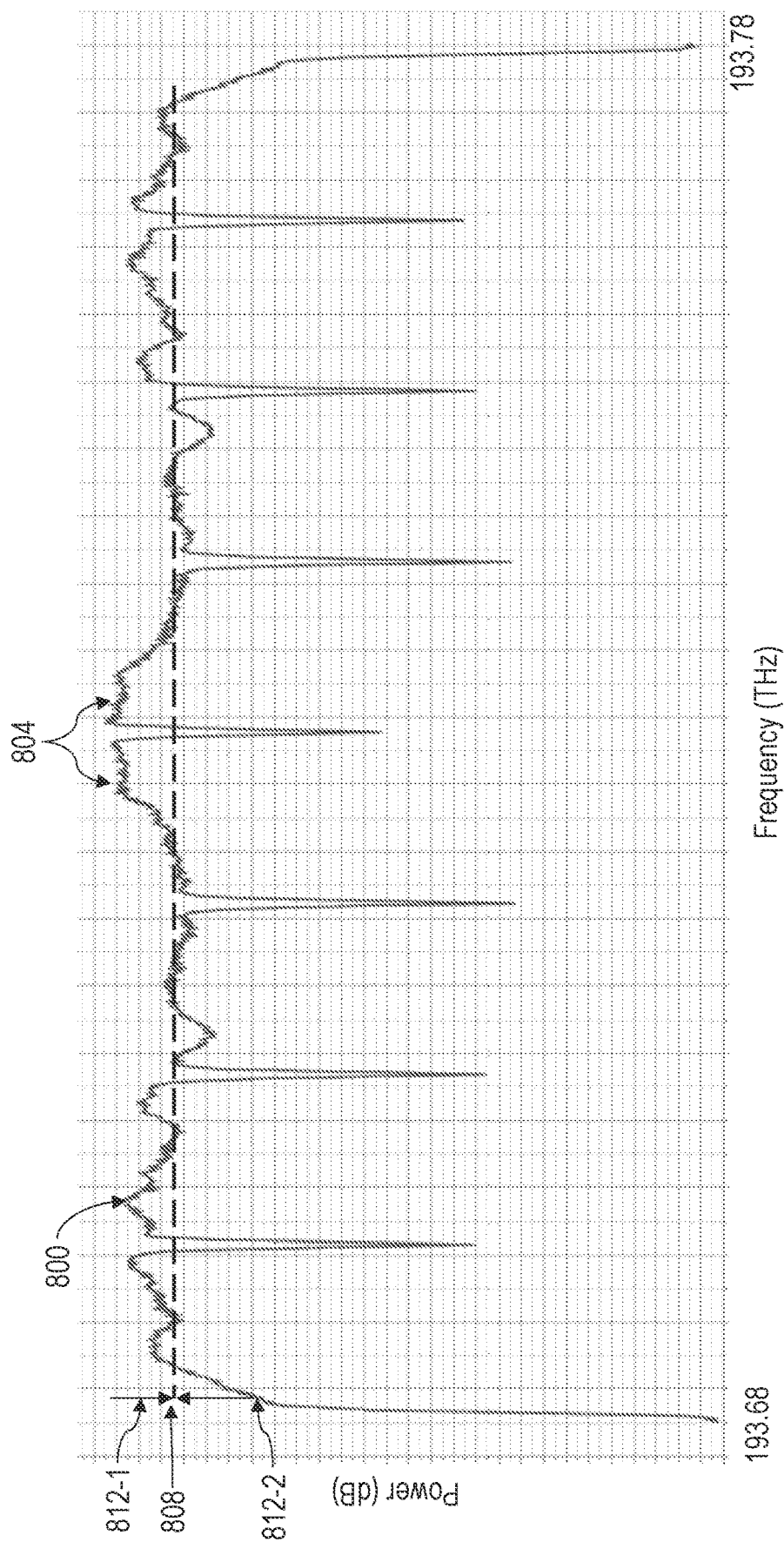
FIG. 21A is a graph of an exemplary embodiment of an optical signal pre-calibration of frequency response.

Referring now to FIG. 21A, shown therein is a graph of an exemplary embodiment of a measured combined optical signal 800 pre-calibration of frequency response. The optical signal 800 is shown for the components with both paths I, Q and polarizations X and Y combined. As shown, the optical signal 800 includes eight subcarriers 804. As shown in FIG. 21A, the optical signal 800 has a power that fluctuates across a frequency range of approximately 193.68 THz to 193.78 THz as shown by a max power difference 812-1 and a min power difference 812-2. The power differences 812 may be effects of impairments introduced to the optical signals by various optical components within the transmitter 70 as described above. Because the power differences 812 are caused by one or more linear time-invariant impairment of the transmitter, the frequency response determination process 600 can be used to calibrate the transmitter and minimize the power differences 812 as shown in FIG. 21B.

Figure 21B:
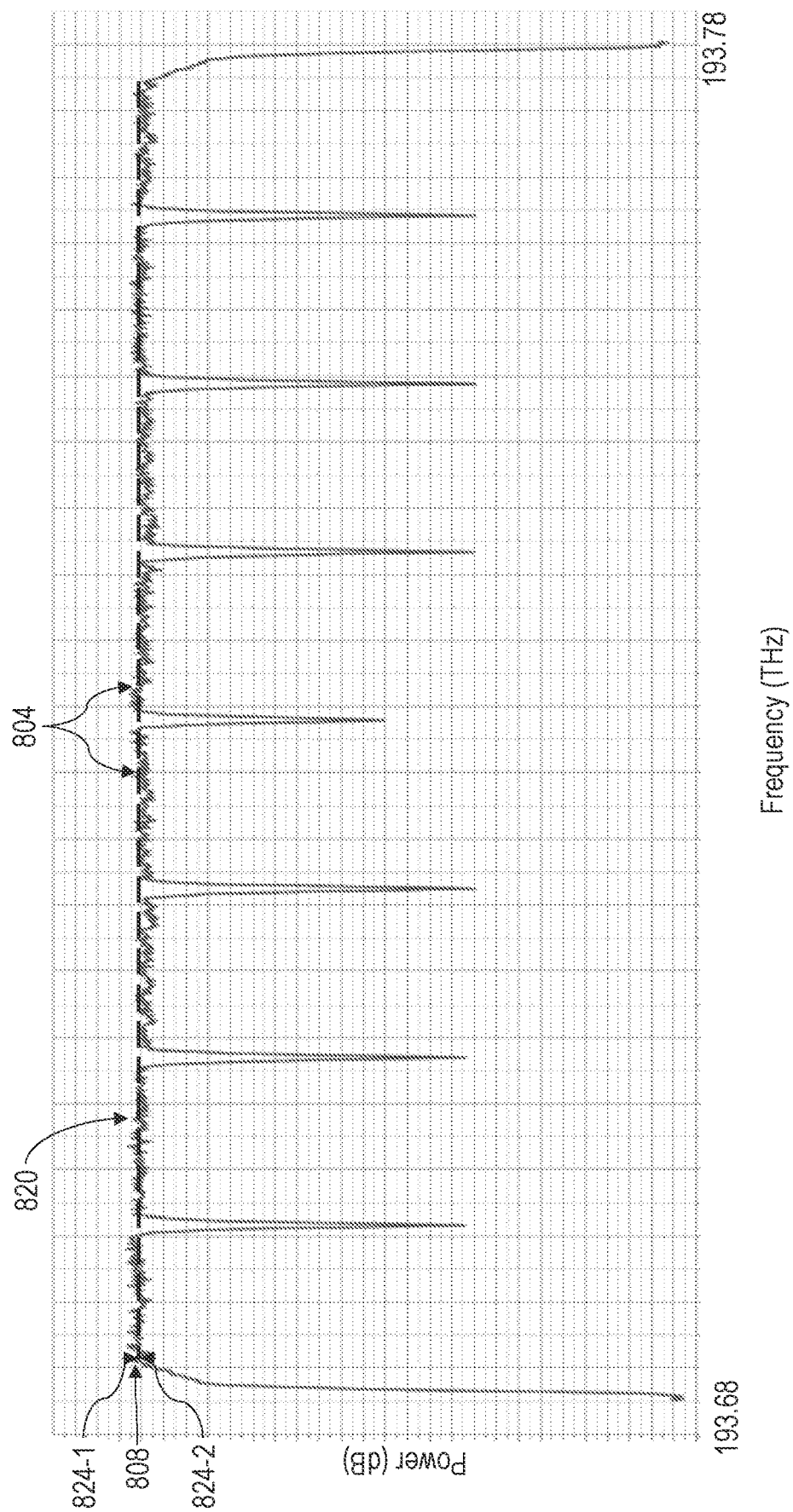
FIG. 21B is a graph of an exemplary embodiment of a calibrated optical signal, post-calibration of frequency response of the optical signal of FIG. 21A.

Referring now to FIG. 21B, shown therein is a graph of an exemplary embodiment of a measured calibrated optical signal 820, post-calibration of frequency response. The calibrated optical signal 820 is shown for the both paths I, Q and both polarizations X and Y combined. As shown, the calibrated optical signal 820 includes eight subcarriers 804, as also shown in FIG. 21A. The calibrated optical signal 820, however, has a power that fluctuates across a frequency range of approximately 193.68 THz to 193.78 THz as shown by a max power difference 824-1 and a min power difference 824-2. The power differences 824 as shown in FIG. 21B (post-calibration) are smaller than the power differences 812 as shown in FIG. 21A (pre-calibration). The power differences 824, compared to the power differences 812, show a reduction in fluctuations and attenuation resulting in the calibrated optical signal 820 being substantially flat to a high resolution, i.e., closely following an average power 808. As shown, the smaller power differences 824 result in a higher-quality optical signal being transmitted from the transmitter 70 to the secondary node 18, thereby allowing the transmitter 70 to transmit data in the optical signal at a faster rate and over longer distances as compared to the pre-calibration optical signal of FIG. 21A. Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:
1. A method, comprising:
   generating electrical signal indicative of an amplitude modulated (AM) tone;
   supplying the electrical signals to digital-to-analog circuitry, which outputs a plurality of analog signals;
   providing the analog signals to driver circuitry, which outputs a plurality of drive signals;
   supplying the drive signals to a modulator including a Mach-Zehnder modulator;
   outputting light from a laser;
   modulating the light output from the laser with the modulator to provide a modulated optical signal, the modulated optical signal including a plurality of optical subcarriers, such that each of the plurality of optical subcarriers has a particular frequency;

collectively applying the AM tone to each of the plurality of optical subcarriers, the AM tone having a fixed amplitude modulated (AM) frequency at a first known carrier frequency component at a first period of time and a second known carrier frequency component at a second period of time;

measuring a power of a modulated optical signal generated based at least in part on the AM tone at the first period of time and at the second period of time; and normalizing measured power to obtain an amplitude response.

2. The method of claim 1, further comprising:
calculating a phase response using the amplitude response; and
generating a frequency response of XI, XQ, YI and YQ based on the phase response and the amplitude response.

3. The method of claim 2, wherein generating the frequency response further includes generating the frequency response of XI, XQ, YI, and YQ for more than one channel.

4. The method of claim 1, wherein applying the tone carrier frequency is defined further as applying the tone carrier frequency component at a first period of time, and a second known carrier frequency component at a second period of time, and further comprising determining the amplitude response using a first power of the modulated optical signal and the first known carrier frequency component at the first period of time and a second power of the modulated optical signal and the second known carrier frequency component at the second period of time, calculating a frequency response based on the amplitude response, and calibrating the optical modulator with the frequency response.

5. The method of claim 1, further comprising generating the modulated optical signal based at least in part on the AM tone and data to be carried by the modulated optical signal.

6. The method of claim 5, wherein the AM tone and data are simultaneously present in the modulated optical signal.

7. The method of claim 1, further comprising calibrating an optical modulator based on the amplitude response.

8. The method of claim 1, further comprising calibrating an optical modulator based on the frequency response.

* * * * *